United States Patent
Wu et al.

(10) Patent No.: US 10,278,115 B2
(45) Date of Patent: Apr. 30, 2019

(54) BEARER ADMISSION CONTROL METHOD AND BEARER ADMISSION CONTROL APPARATUS

(71) Applicant: CHINA ACADEMY OF TELECOMMUNICATIONS TECHNOLOGY, Beijing (CN)

(72) Inventors: Yumin Wu, Beijing (CN); Dajun Zhang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 14 days.

(21) Appl. No.: 15/327,646

(22) PCT Filed: Jul. 16, 2015

(86) PCT No.: PCT/CN2015/084224
§ 371 (c)(1),
(2) Date: Jan. 19, 2017

(87) PCT Pub. No.: WO2016/019789
PCT Pub. Date: Feb. 11, 2016

(65) Prior Publication Data
US 2017/0215125 A1    Jul. 27, 2017

(30) Foreign Application Priority Data
Aug. 5, 2014   (CN) .......................... 2014 1 0381925

(51) Int. Cl.
*H04W 48/08*    (2009.01)
*H04W 36/00*    (2009.01)
(Continued)

(52) U.S. Cl.
CPC ........... *H04W 48/08* (2013.01); *H04W 36/00* (2013.01); *H04W 72/04* (2013.01); *H04W 36/24* (2013.01)

(58) Field of Classification Search
CPC ............. H04W 28/00; H04W 28/0252; H04W 28/0263; H04W 28/08; H04W 28/085;
(Continued)

(56) References Cited

U.S. PATENT DOCUMENTS

2004/0028078 A1   2/2004  Beckmann et al.
2012/0163313 A1   6/2012  Ryul et al.
(Continued)

FOREIGN PATENT DOCUMENTS

CN       102348244 A    2/2012
CN       102480712 A    5/2012
(Continued)

OTHER PUBLICATIONS

International Preliminary Report on Patentability (IPRP; CH 1) for PCT/CN2015/084224 dated Feb. 16, 2017 and its English translation provided by WIPO.
(Continued)

*Primary Examiner* — Warner Wong
(74) *Attorney, Agent, or Firm* — Ladas & Parry, LLP

(57) ABSTRACT

The bearer admission control method includes: when an MeNB needs to perform bearer separation with an SeNB with respect to an identical UE, sending, by the MeNB, an SeNB addition request message to the SeNB, the SeNB addition request message carrying information about a list of E-RABs corresponding to the UE to be admitted by the SeNB and indication information indicating whether or not data is to be distributed for the bearer in a specific direction, the specific direction being an uplink or a downlink direction; and receiving, by the MeNB, a feedback message from
(Continued)

the SeNB to acquire a bearer admission result of the SeNB, configuring, by the MeNB, connection for the UE in the case that the MeNB has accepted the bearer admission result of the SeNB, and otherwise, sending, by the MeNB, a message for rejecting the bearer admission result of the SeNB to the SeNB.

20 Claims, 8 Drawing Sheets

(51) Int. Cl.
H04W 72/04 (2009.01)
H04W 36/24 (2009.01)

(58) Field of Classification Search
CPC . H04W 36/00; H04W 36/0027; H04W 36/16; H04W 36/165; H04W 36/22; H04W 36/24; H04W 36/28; H04W 36/34; H04W 36/38; H04W 36/385; H04W 16/08; H04L 12/2869; H04L 2012/5629; H04L 2012/6445; H04L 47/70
See application file for complete search history.

(56) References Cited

U.S. PATENT DOCUMENTS

| | | | | |
|---|---|---|---|---|
| 2014/0204771 A1* | 7/2014 | Gao | H04W 36/28 370/252 |
| 2015/0045052 A1* | 2/2015 | Pao | H04W 88/06 455/453 |
| 2015/0124748 A1* | 5/2015 | Park | H04L 5/0032 370/329 |
| 2015/0133128 A1 | 5/2015 | Xiong et al. | |
| 2015/0139192 A1 | 5/2015 | Zhang et al. | |
| 2015/0148046 A1* | 5/2015 | Lim | H04W 36/22 455/444 |
| 2015/0215967 A1* | 7/2015 | Han | H04W 74/0833 370/329 |
| 2015/0223095 A1* | 8/2015 | Centonza | H04W 36/0088 455/67.11 |
| 2015/0296408 A1* | 10/2015 | Furuta | H04W 28/0289 370/232 |
| 2015/0326456 A1* | 11/2015 | Dudda | H04L 43/062 370/252 |
| 2016/0057687 A1* | 2/2016 | Horn | H04W 24/10 370/331 |
| 2016/0143003 A1* | 5/2016 | Yi | H04L 1/08 370/329 |
| 2016/0157155 A1* | 6/2016 | Chiba | H04W 76/041 455/436 |
| 2016/0212661 A1* | 7/2016 | Basu Mallick | H04L 1/1614 |
| 2016/0255675 A1* | 9/2016 | Van Lieshout | H04L 1/1829 370/329 |
| 2016/0277987 A1* | 9/2016 | Chen | H04L 5/0085 |
| 2016/0337895 A1* | 11/2016 | Lee | H04W 28/0205 |
| 2016/0338130 A1* | 11/2016 | Park | H04W 76/025 |
| 2016/0338140 A1* | 11/2016 | Zhang | H04W 36/34 |
| 2016/0345204 A1* | 11/2016 | Godin | H04W 40/34 |
| 2016/0366616 A1* | 12/2016 | Wen | H04W 28/0231 |
| 2017/0006484 A1* | 1/2017 | Lee | H04W 76/10 |
| 2017/0086093 A1* | 3/2017 | Chen | H04W 72/1284 |
| 2017/0222876 A1* | 8/2017 | Van Der Velde | H04W 76/025 |
| 2018/0063861 A1* | 3/2018 | Zhang | H04W 72/1278 |

FOREIGN PATENT DOCUMENTS

| | | |
|---|---|---|
| CN | 102655682 A | 9/2012 |
| CN | 103546928 A | 1/2014 |
| CN | 104202778 A | 12/2014 |
| EP | 2603038 A1 | 6/2013 |
| EP | 2869633 A1 | 5/2015 |
| WO | 2008/017693 A1 | 2/2008 |
| WO | 2014/000682 A1 | 1/2014 |
| WO | 2014/015472 A1 | 1/2014 |

OTHER PUBLICATIONS

Written Opinion of the International Search Authority for PCT/CN2015/084224 dated Oct. 15, 2015 and its machine English translation provided by WIPO.
From EP Application No. 15829693.9, Supplementary European Search Report and Search Opinion dated May 29, 2017.
From CN Application No. 201410381925.5, Office Action dated Apr. 1, 2017 with Search Report and its English translation provided by Global Dossier.
International Search Report for PCT/CN2015/084224 dated Oct. 15, 2015 and its English translation provided by WIPO.
Written Opinion of the International Search Authority for PCT/CN2015/084224 dated Oct. 15, 2015 and its machine English translation from Google translate.

* cited by examiner

BEARER ADMISSION CONTROL METHOD AND BEARER ADMISSION CONTROL APPARATUS

CROSS-REFERENCE TO RELATED APPLICATIONS

The present application is the U.S. national phase of PCT Application No. PCT/CN2015/084224 filed on Jul. 16, 2015, which claims priority to the Chinese Patent Application No. 201410381925.5 filed on Aug. 5, 2014, the disclosures of which are incorporated herein by reference in their entireties.

TECHNICAL FIELD

The present disclosure relates to the field of communication technology, in particular to a bearer admission control method and a bearer admission control apparatus.

BACKGROUND

Along with the development of more and more local nodes such as Femtocells, microcells and relays, traditional macrocell-based network architecture has gradually evolved into network architecture where various base stations coexist, so as to achieve the network coverage at multiple layers. In order to improve the relevant performances of the network architecture where the various base stations coexist, network architecture for coordination/aggregation among Evolved NodeBs (eNBs) via a non-ideal link has been proposed, and in this architecture, parts of Radio Bearers (RBs) of a User Equipment (UE) are carried on a Master Cell Group (MCG) managed by a Master eNB (MeNB). The parts of RBs include Signaling Radio Bearers (SRBs) and Data Radio Bearers (DRBs). The other parts of RBs of the same UE (including both SRBs and DRBs) are carried on a Secondary Cell Group (SCG) managed by a Slave eNB (SeNB). During the separation of the RBs of the UE, uplink data and downlink data for the UE may be transmitted simultaneously on two eNBs respectively. Due to the imbalance of the uplink and downlink load, merely the uplink data or the downlink data on one RB may be admitted by the eNB in the case of congestion. However, it is impossible for the current admission control to support the eNB to separately admit the uplink data or downlink data on one RB. At this time, both the uplink data and the downlink data on the RB will be rejected.

A bearer separation technology will be described hereinafter briefly.

Referring to FIG. 1, in a possible multi-layered network coverage environment, a non-ideal data/signaling interface Xn (a wired or wireless interface) may be adopted between an MeNB and an SeNB, and the UE may be operated simultaneously at the MeNB and the SeNB. In the case that a UE connected to the MeNB enters the coverage of a cell corresponding to the SeNB, considering a signal intensity or load balance, the MeNB may transfer a part of, or all of, the data/signaling of the UE to the SeNB, so as to acquire services provided by the SeNB, thereby to enable the UE to use resources of the MeNB and the SeNB simultaneously and achieve inter-eNB aggregation. In this scenario, the RBs of the UE may be carried by a cell (MCell) controlled by the MeNB and a cell (SCell) controlled by the SeNB respectively. The RBs transferred to the SeNB may include DRBs and/or SRB. Because the SeNB is controlled by the MeNB, so the SeNB may be considered as a controlled eNB, and the MeNB may be considered as a controlling eNB.

FIG. 2 shows a bearer separation architecture, where the UE may include separate RBs for the MeNB and the SeNB, and include a separate Packet Data Convergence Protocol (PDCP) entity on each eNB. The uplink data and the downlink data for an identical RB may not be transmitted over the MeNB and the SeNB simultaneously.

FIG. 3 shows another bearer separation architecture, where the UE may include separate RBs for the data on the MeNB, and a part of the data carried by an identical Evolved Packet System (EPS) on the MeNB may be transmitted over the SeNB. The PDCP entity carried by the EPS is still included in the MeNB, while a separate Radio Link Control (RLC) entity is included in the SeNB.

For an identical downlink bearer, the MeNB may control whether or not the data is to be transmitted over the SeNB or MeNB, or the quantity of the data to be transmitted (the data distribution for the downlink bearer).

For an identical uplink bearer, the uplink data of the UE may be configured by the network to be transmitted merely by the MeNB or SeNB (i.e., the uplink data may not be distributed), or to be transmitted over the MeNB and the SeNB at a certain proportion (i.e., the uplink data may be distributed over the MeNB and the SeNB). For example, 50% of the uplink data of the UE may be configured by the MeNB to be transmitted over the MCG, while the remaining 50% of the uplink data may be configured to be transmitted on over the SCG.

Radio Admission Control (RAC), as a functional module of each eNB, is used to control the admission or rejection of a request for establishing a new RB. In this regard, the RAC needs to take an entire resource condition at a network side, a Quality of Service (QoS) requirement of the new RB, QoS guarantee provided by an on-going progress, and a priority and system QoS requirement into consideration. The RAC aims to admit the request for establishing the RB and provide corresponding available radio resources, so as to improve the radio resource utilization. In addition, the RAC also aims to reject the request for establishing the RB, so as to ensure the QoS for the on-going progress.

During a handover process, a source eNB may provide a list of Evolved Universal Terrestrial Radio Access Network (E-UTRAN) Radio Access Bearers (E-RABs) to be established to a target eNB in a handover request. Then, the target eNB may admit all of, or parts of, these E-RABs in accordance with its actually-available resources. As shown in FIG. 4, in the case that it is impossible for the target eNB to admit any bearers in the handover request, it may return a handover preparation failure message to the source eNB. As shown in FIG. 5, in the case that the target eNB has admitted parts of, or all of, the E-RABs, it may return a handover request acknowledgement message to the source eNB, and a list of the admitted E-RABs, a list of the rejected E-RABs and a rejection cause may be carried in this message.

During bearer establishment in a non-handover process, as shown in FIG. 6, a Mobile Management Entity (MME) may send an E-RAB setup request message to the eNB during the bearer establishment process, and a list of the E-RABs to be established may be carried in this message. Then, the eNB may admit all of, or parts of, these E-RABs in accordance with its actually-available resources. In the case that the eNB has admitted parts of, or all of, the E-RABs or rejected all of the E-RABs, it may return an E-RAB setup response message to the MME, and the list of admitted E-RABs, the list of the rejected E-RABs and the rejection cause may be carried in this message.

In a word, in the case of bearer separation, one bearer of the UE may be connected to a plurality of eNB simultaneously. In the case that a current eNB is able to merely accept the downlink data or the uplink data, the admission control of the current eNB may reject all the uplink and downlink data on the bearer. As a result, it is impossible to increase a transmission rate at a UE side due to only uplink bearer separation or only downlink bearer separation, so it is impossible to acquire a gain in the load balance at a network side due to only uplink bearer separation or only downlink bearer separation. In the case of a heavy network load, the bearer or UE connection may probably be released.

SUMMARY

An object of the present disclosure is to provide an admission control method, an admission control apparatus, and an eNB, so as to enable the eNB to separately admit uplink or downlink data during the admission control, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

In one aspect, the present disclosure provides in some embodiments a bearer admission control method, including steps of: in the case that an MeNB needs to perform bearer separation with an SeNB with respect to an identical UE, sending, by the MeNB, an SeNB addition request message to the SeNB, the SeNB addition request message carrying information about a list of E-RABs corresponding to the UE to be admitted by the SeNB as well as indication information indicating whether or not data is to be distributed for the bearer in a specific direction, the specific direction being an uplink direction or a downlink direction; and receiving, by the MeNB, a feedback message from the SeNB so as to acquire a bearer admission result of the SeNB, configuring, by the MeNB, connection for the UE in the case that the MeNB has accepted the bearer admission result of the SeNB, and otherwise, sending, by the MeNB, a message for rejecting the bearer admission result of the SeNB to the SeNB.

According to the bearer admission control method in the embodiments of the present disclosure, in the case that the MeNB needs to perform the bearer separation with the SeNB with respect to the same UE and the SeNB needs to be added, it may indicate the SeNB whether or not the data is to be distributed for the bearer in the uplink or downlink direction. Next, the SeNB may send the message for indicating the bearer admission result, i.e., whether or not an uplink or downlink bearer is to be admitted, to the MeNB, so as to enable the eNB to selectively admit the uplink or downlink bearer of the UE, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

Optionally, the bearer admission result of the SeNB includes: a bearer in the specific direction to be admitted or rejected by the SeNB; indication information indicating the data of the UE in the specific direction to be transmitted over the SeNB or the MeNB for the bearers admitted by the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction.

Optionally, the SeNB addition request message further includes indication information indicating whether the data of the UE in the specific direction is to be transmitted over the MeNB or the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction. The bearer admission result of the SeNB includes a bearer in the specific direction to be admitted or rejected by the SeNB.

Optionally, the bearer admission result of the SeNB further includes: a bearer in the specific direction incapable of being admitted by the SeNB; change information about the data of the UE in the specific direction to be transmitted over the MeNB in the case that the data is not to be distributed for the bearer in the specific direction; and change information about a proportion of the data of the UE in the specific direction to be transmitted over the SeNB in the case that the data is to be distributed for the bearer in the specific direction.

Optionally, in the case that the admission of the bearer in the specific direction has been rejected by the SeNB, the SeNB does not feed back to the MeNB a data transmission state of the UE in the specific direction.

Optionally, the bearer admission control method further includes: receiving, by the MeNB, a direction change request from the SeNB, the direction change request indicating change information about the data of the UE in the specific direction to be transmitted over the MeNB in the case that the data is not to be distributed for the bearer in the specific direction; and in the case that the MeNB has accepted the direction change request from the SeNB, configuring, by the MeNB, the connection for the UE, and otherwise, sending, by the MeNB, a message for rejecting the direction change request to the SeNB.

Optionally, the bearer admission control method further includes: receiving, by the MeNB, a proportion change request from the SeNB, the proportion change request indicating change information about the proportion of the data of the UE in the specific direction to be transmitted over the MeNB and/or the proportion of the data of the UE in the specific direction to be transmitted over the SeNB in the case that the data is to be distributed for the bearer in the specific direction; and in the case that the MeNB has accepted the proportion change request from the SeNB, configuring, by the MeNB, the connection for the UE, and otherwise sending, by the MeNB, a message for rejecting the proportion change request to the SeNB.

In another aspect, the present disclosure provides in some embodiments a bearer admission control method, including steps of: receiving, by an SeNB, an SeNB addition request message from an MeNB in the case that the MeNB needs to perform bearer separation with the SeNB with respect to an identical UE, acquiring, from the SeNB addition request message, information about a list of E-RABs corresponding to the UE to be admitted by the SeNB as well as indication information indicating whether or not data is to be distributed for the bearer in a specific direction, the specific direction being an uplink direction or a downlink direction; and generating, by the SeNB, a bearer admission result in accordance with the information about the list of the E-RABs and the indication information, and sending, by the SeNB, a feedback message to the MeNB, the feedback message carrying the bearer admission result of the SeNB.

According to the bearer admission control method in the embodiments of the present disclosure, in the case that the MeNB needs to perform the bearer separation with the SeNB with respect to the same UE and the SeNB needs to be added, the SeNB may receive the indication information indicating whether or not the data is to be distributed for the bearer in the uplink or downlink direction, and send the message for indicating the bearer admission result, i.e., whether or not an uplink or downlink bearer is to be admitted, to the MeNB, so as to enable the eNB to selectively admit the uplink or downlink bearer of the UE, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

Optionally, the bearer admission result includes: a bearer in the specific direction to be admitted or rejected by the SeNB; indication information indicating the data of the UE in the specific direction to be transmitted over the SeNB or the MeNB for the bearers admitted by the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction.

Optionally, the SeNB addition request message further includes indication information indicating whether the data of the UE in the specific direction is to be transmitted over the MeNB or the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction. The bearer admission result of the SeNB includes a bearer in the specific direction to be admitted or rejected by the SeNB.

Optionally, the bearer admission result of the SeNB further includes: a bearer in the specific direction incapable of being admitted by the SeNB; change information about the data of the UE in the specific direction to be transmitted over the MeNB in the case that the data is not to be distributed for the bearer in the specific direction; and change information about a proportion of the data of the UE in the specific direction to be transmitted over the SeNB in the case that the data is to be distributed for the bearer in the specific direction.

Optionally, in the case that the admission of the bearer in the specific direction has been rejected by the SeNB, the SeNB does not feed back to the MeNB a data transmission state of the UE in the specific direction.

Optionally, the bearer admission control method further includes, when the data of the UE in the specific direction is changed to be transmitted over the MeNB, sending, by the SeNB, a direction change request to the MeNB, the direction change request carrying change information about the data of the UE in the specific direction to be transmitted over the MeNB in the case that the data is not to be distributed for the bearer in the specific direction.

Optionally, the bearer admission control method further includes, in the case that the proportion of the data of the UE in the specific direction to be transmitted over the MeNB and the proportion of the data of the UE in the specific direction to be transmitted over the SeNB need to be changed, sending, by the SeNB, a proportion change request to the MeNB, the proportion change request carrying change information about the proportion of the data of the UE in the specific direction to be transmitted over the MeNB and/or the proportion of the data of the UE in the specific direction to be transmitted over the SeNB in the case that the data is to be distributed for the bearer in the specific direction.

In yet another aspect, the present disclosure provides in some embodiments a bearer admission control apparatus, including: an SeNB addition unit configured to, in the case that an MeNB needs to perform bearer separation with an SeNB with respect to an identical UE, send an SeNB addition request message to the SeNB, the SeNB addition request message carrying information about a list of E-RABs corresponding to the UE to be admitted by the SeNB as well as indication information indicating whether or not data is to be distributed for the bearer in a specific direction, the specific direction being an uplink direction or a downlink direction; and a first determination and processing unit configured to receive a feedback message from the SeNB so as to acquire a bearer admission result of the SeNB, configure connection for the UE in the case that the bearer admission result of the SeNB has been accepted, and otherwise, send a message for rejecting the bearer admission result of the SeNB to the SeNB.

According to the bearer admission control apparatus in the embodiments of the present disclosure, in the case that the MeNB needs to perform the bearer separation with the SeNB with respect to the same UE and the SeNB needs to be added, it may indicate the SeNB whether or not the data is to be distributed for the bearer in the uplink or downlink direction. Next, the SeNB may send the message for indicating the bearer admission result, i.e., whether or not an uplink or downlink bearer is to be admitted, to the MeNB, so as to enable the eNB to selectively admit the uplink or downlink bearer of the UE, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

Optionally, the bearer admission result of the SeNB includes: a bearer in the specific direction to be admitted or rejected by the SeNB; indication information indicating the data of the UE in the specific direction to be transmitted over the SeNB or the MeNB for the bearers admitted by the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction.

Optionally, the SeNB addition request message further includes indication information indicating whether the data of the UE in the specific direction is to be transmitted over the MeNB or the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction. The bearer admission result of the SeNB includes a bearer in the specific direction to be admitted or rejected by the SeNB.

Optionally, the bearer admission result of the SeNB further includes: a bearer in the specific direction incapable of being admitted by the SeNB; change information about the data of the UE in the specific direction to be transmitted over the MeNB in the case that the data is not to be distributed for the bearer in the specific direction; and change information about a proportion of the data of the UE in the specific direction to be transmitted over the SeNB in the case that the data is to be distributed for the bearer in the specific direction.

Optionally, the first determination and processing unit is further configured to: receive a direction change request from the SeNB, the direction change request indicating change information about the data of the UE in the specific direction to be transmitted over the MeNB in the case that the data is not to be distributed for the bearer in the specific direction; and in the case that the direction change request from the SeNB has been accepted, configure the connection for the UE, and otherwise, send a message for rejecting the direction change request to the SeNB.

Optionally, the first determination and processing unit is further configured to: receive a proportion change request from the SeNB, the proportion change request indicating change information about the proportion of the data of the UE in the specific direction to be transmitted over the MeNB and/or the proportion of the data of the UE in the specific direction to be transmitted over the SeNB in the case that the data is to be distributed for the bearer in the specific direction; and in the case that the proportion change request from the SeNB has been accepted, configure the connection for the UE, and otherwise send a message for rejecting the proportion change request to the SeNB.

Optionally, the bearer admission control apparatus further includes: a reception unit configured to receive, in the case that the MeNB needs to perform the bearer separation with the SeNB with respect to the same UE, the SeNB addition request message from the MeNB so as to acquire the information about the list of the E-RABs corresponding to the UE to be admitted by the SeNB and the indication information indicating whether or not data is to be distributed for the bearer in the specific direction, the specific direction being an uplink direction or a downlink direction; and a second determination and processing unit configured to generate the bearer admission result in accordance with the information about the list of the E-RABs and the indication information, and send a feedback message to the MeNB, the feedback message carrying the bearer admission result.

In still yet another aspect, the present disclosure provides in some embodiments a bearer admission control apparatus, including: a reception unit configured to receive, in the case that an MeNB needs to perform bearer separation with an SeNB with respect to an identical UE, an SeNB addition request message from the MeNB so as to acquire information about a list of E-RABs corresponding to the UE to be admitted by the SeNB and indication information indicating whether or not data is to be distributed for the bearer in a specific direction, the specific direction being an uplink direction or a downlink direction; and a second determination and processing unit configured to generate a bearer admission result in accordance with the information about the list of the E-RABs and the indication information, and send a feedback message to the MeNB, the feedback message carrying the bearer admission result.

According to the bearer admission control apparatus in the embodiments of the present disclosure, in the case that the MeNB needs to perform the bearer separation with the SeNB with respect to the same UE and the SeNB needs to be added, the SeNB may receive the indication information indicating whether or not the data is to be distributed for the bearer in the uplink or downlink direction, and send the message for indicating the bearer admission result, i.e., whether or not an uplink or downlink bearer is to be admitted, to the MeNB, so as to enable the eNB to selectively admit the uplink or downlink bearer of the UE, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

Optionally, the bearer admission result includes: a bearer in the specific direction to be admitted or rejected by the SeNB; indication information indicating the data of the UE in the specific direction to be transmitted over the SeNB or the MeNB for the bearers admitted by the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction.

Optionally, the SeNB addition request message further includes indication information indicating whether the data of the UE in the specific direction is to be transmitted over the MeNB or the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction. The bearer admission result of the SeNB includes a bearer in the specific direction to be admitted or rejected by the SeNB.

Optionally, the bearer admission result of the SeNB further includes: a bearer in the specific direction incapable of being admitted by the SeNB; change information about the data of the UE in the specific direction to be transmitted over the MeNB in the case that data is not to be distributed for the bearer in the specific direction; and change information about a proportion of the data of the UE in the specific direction to be transmitted over the SeNB in the case that the data is to be distributed for the bearer in the specific direction.

Optionally, the second determination and processing unit is further configured to, when the data of the UE in the specific direction is changed to be transmitted over the MeNB, send a direction change request to the MeNB, the direction change request carrying change information about the data of the UE in the specific direction to be transmitted over the MeNB in the case that the data is not to be distributed for the bearer in the specific direction.

Optionally, the second determination and processing unit is further configured to, in the case that the proportion of the data of the UE in the specific direction to be transmitted over the MeNB and the proportion of the data of the UE in the specific direction to be transmitted over the SeNB need to be changed, send a proportion change request to the MeNB, the proportion change request carrying change information about the proportion of the data of the UE in the specific direction to be transmitted over the MeNB and/or the proportion of the data of the UE in the specific direction to be transmitted over the SeNB in the case that the data is to be distributed for the bearer in the specific direction.

In still yet another aspect, the present disclosure provides in some embodiments an eNB, including a processor and a transceiver. In the case that the eNB is an MeNB and the MeNB needs to perform bearer separation with an SeNB with respect to an identical UE, the processor is configured to: generate an SeNB addition request message and trigger the transceiver to send the SeNB addition request message to the SeNB, the SeNB addition request message carrying information about a list of E-RABs corresponding to the UE admitted by the SeNB as well as indication information indicating whether or not data is to be distributed for the bearer in a specific direction, the specific direction being an uplink direction or a downlink direction; and in the case that the a feedback message has been received by the transceiver from the SeNB, acquire a bearer admission result of the SeNB, configure connection for the UE and trigger the transceiver to send a connection configuration to the UE in the case that the bearer admission result of the SeNB has been accepted, and otherwise trigger the transceiver to send a message for rejecting the bearer admission result of the SeNB to the SeNB.

According to the MeNB in the embodiments of the present disclosure, in the case that the MeNB needs to perform the bearer separation with the SeNB with respect to the same UE and the SeNB needs to be added, it may indicate the SeNB whether or not the data is to be distributed for the bearer in the uplink or downlink direction. Next, the SeNB may send the message for indicating the bearer admission result, i.e., whether or not an uplink or downlink bearer is to be admitted, to the MeNB, so as to enable the eNB to selectively admit the uplink or downlink bearer of the UE, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

Optionally, the bearer admission result of the SeNB includes: a bearer in the specific direction to be admitted or rejected by the SeNB; indication information indicating the data of the UE in the specific direction to be transmitted over the SeNB or the MeNB for the bearers admitted by the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction.

Optionally, the SeNB addition request message further includes indication information indicating whether the data of the UE in the specific direction is to be transmitted over the MeNB or the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction. The bearer admission result of the SeNB includes a bearer in the specific direction to be admitted or rejected by the SeNB.

Optionally, the bearer admission result of the SeNB further includes: a bearer in the specific direction incapable of being admitted by the SeNB; change information about the data of the UE in the specific direction to be transmitted over the MeNB in the case that data is not to be distributed for the bearer in the specific direction; and change information about a proportion of the data of the UE in the specific direction to be transmitted over the SeNB in the case that the data is to be distributed for the bearer in the specific direction.

Optionally, the transceiver is further configured to receive a direction change request from the SeNB, the direction change request indicating change information about the data of the UE in the specific direction to be transmitted over the MeNB in the case that the data is not to be distributed for the bearer in the specific direction. In the case that the direction change request from the SeNB has been accepted, the processor is further configured to configure the connection for the UE and trigger the transceiver to transmit the connection configuration to the UE, and otherwise trigger the transceiver to send a message for rejecting the direction change request to the SeNB.

Optionally, the transceiver is further configured to receive a proportion change request from the SeNB, the proportion change request indicating change information about the proportion of the data of the UE in the specific direction to be transmitted over the MeNB and/or the proportion of the data of the UE in the specific direction to be transmitted over the SeNB in the case that the data is to be distributed for the bearer in the specific direction. In the case that the proportion change request from the SeNB has been accepted, the processor is further configured to configure the connection for the UE and trigger the transceiver to send the connection configuration to the UE, and otherwise trigger the transceiver to send a message for rejecting the proportion change request to the SeNB.

Optionally, the transceiver is further configured to, in the case that the eNB is the SeNB, receive the SeNB addition request message from the MeNB in the case that the MeNB needs to perform the bearer separation with the SeNB with respect to the same UE. The processor is further configured to: acquire from the SeNB addition request message the information about the list of the E-RABs corresponding to the UE to be admitted by the SeNB and the indication information indicating whether or not the data is to be distributed for the bearer in the specific direction, the specific direction being an uplink direction or a downlink direction; and generate the bearer admission result in accordance with the information about the list of the E-RABs and the indication information, and trigger the transceiver to send the feedback message to the MeNB, the feedback message carrying the bearer admission result.

In still yet another aspect, the present disclosure provides in some embodiments an eNB, including a processor and a transceiver. In the case that the eNB is an SeNB, the transceiver is configured to receive an SeNB addition request message from an MeNB in the case that the MeNB needs to perform bearer separation with the SeNB with respect to an identical UE. The processor is configured to: acquire from the SeNB addition request message information about a list of E-RABs corresponding to the UE to be admitted by the SeNB and indication information indicating whether or not the data is to be distributed for the bearer in a specific direction, the specific direction being an uplink direction or a downlink direction; and generate the bearer admission result in accordance with the information about the list of the E-RABs and the indication information, and trigger the transceiver to send a feedback message to the MeNB, the feedback message carrying a bearer admission result.

According to the SeNB in the embodiments of the present disclosure, in the case that the MeNB needs to perform the bearer separation with the SeNB with respect to the same UE and the SeNB needs to be added, the SeNB may receive the indication information indicating whether or not the data is to be distributed for the bearer in the uplink or downlink direction, and send the message for indicating the bearer admission result, i.e., whether or not an uplink or downlink bearer is to be admitted, to the MeNB, so as to enable the eNB to selectively admit the uplink or downlink bearer of the UE, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

Optionally, the bearer admission result includes: a bearer in the specific direction to be admitted or rejected by the SeNB; indication information indicating the data of the UE in the specific direction to be transmitted over the SeNB or the MeNB for the bearers admitted by the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction.

Optionally, the SeNB addition request message further includes indication information indicating whether the data of the UE in the specific direction is to be transmitted over the MeNB or the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction. The bearer admission result of the SeNB includes a bearer in the specific direction to be admitted or rejected by the SeNB.

Optionally, the bearer admission result of the SeNB further includes: a bearer in the specific direction incapable of being admitted by the SeNB; change information about the data of the UE in the specific direction to be transmitted over the MeNB in the case that data is not to be distributed for the bearer in the specific direction; and change information about a proportion of the data of the UE in the specific direction to be transmitted over the SeNB in the case that the data is to be distributed for the bearer in the specific direction.

Optionally, the processor is further configured to, in the case that the data of the UE in the specific direction is changed to be transmitted over the MeNB, trigger the transceiver to send a direction change request to the MeNB, the direction change request indicating change information about the data of the UE in the specific direction to be transmitted over the MeNB in the case that the data is not to be distributed for the bearer in the specific direction.

Optionally, the processor is further configured to, in the case that the proportion of the data of the UE in the specific direction to be transmitted over the MeNB and the proportion of the data of the UE in the specific direction to be transmitted over the SeNB need to be changed, trigger the transceiver to send a proportion change request to the MeNB, the proportion change request carrying change information about the proportion of the data of the UE in the specific direction to be transmitted over the MeNB and/or the proportion of the data of the UE in the specific direction to be transmitted over the SeNB in the case that the data is to be distributed for the bearer in the specific direction.

BRIEF DESCRIPTION OF THE DRAWINGS

FIG. 12 is a flow chart of a bearer admission control method according to the sixth embodiment of the present disclosure;

DETAILED DESCRIPTION OF THE EMBODIMENTS

An object of the present disclosure is to provide an admission control method, an admission control apparatus, and an eNB, so as to enable the eNB to separately admit uplink or downlink data during the admission control, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

In the embodiments of the present disclosure, in the case that the admission control is performed by the eNB, it may selectively admit an uplink bearer or a downlink bearer of a UE. An SeNB may send to an MeNB a message indicating whether or not the uplink or downlink bearer is to be admitted. The SeNB may send to the MeNB a message, so as to a request to change a direction or proportion of data to be transmitted. After the MeNB has received the request, it may send to the SeNB a feedback message indicating whether or not the request has been accepted.

In the following embodiments of the present disclosure, the so-called uplink data transmission direction refers to that the uplink data is transmitted over the MeNB or the SeNB, and the so-called downlink data transmission direction refers to that the downlink data is transmitted over the MeNB or SeNB.

The present disclosure will be described hereinafter in conjunction with the embodiments.

First Embodiment

SeNB addition process for the addition of an SeNB (for an uplink bearer, the direction or proportion of the data is not provided by the MeNB to SeNB, and instead, the direction or proportion of the data is determined by the SeNB itself)

Figure 7:
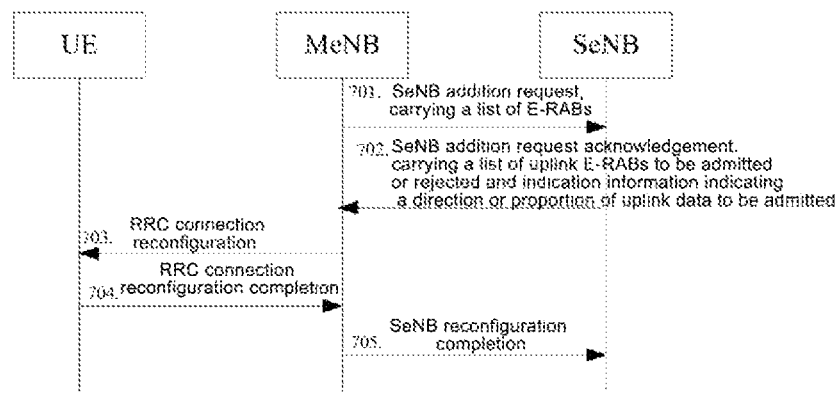
FIG. 7 is a flow chart of a bearer admission control method according to the first embodiment of the present disclosure.

Referring to FIG. 7, the present disclosure provides in this embodiment a bearer admission control method, which includes the following steps.

Figure 1:
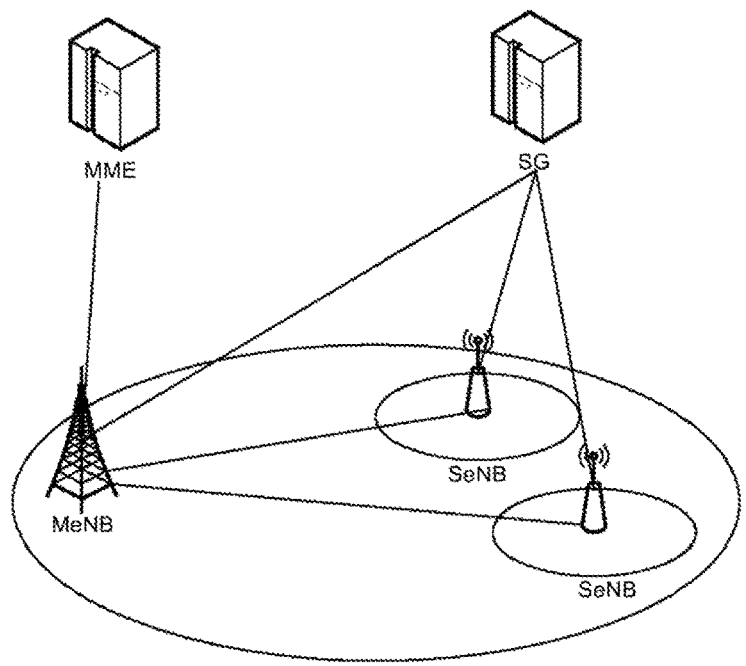
FIG. 1 is a schematic view showing a network scenario for bearer separation in the related art.
Figure 2:
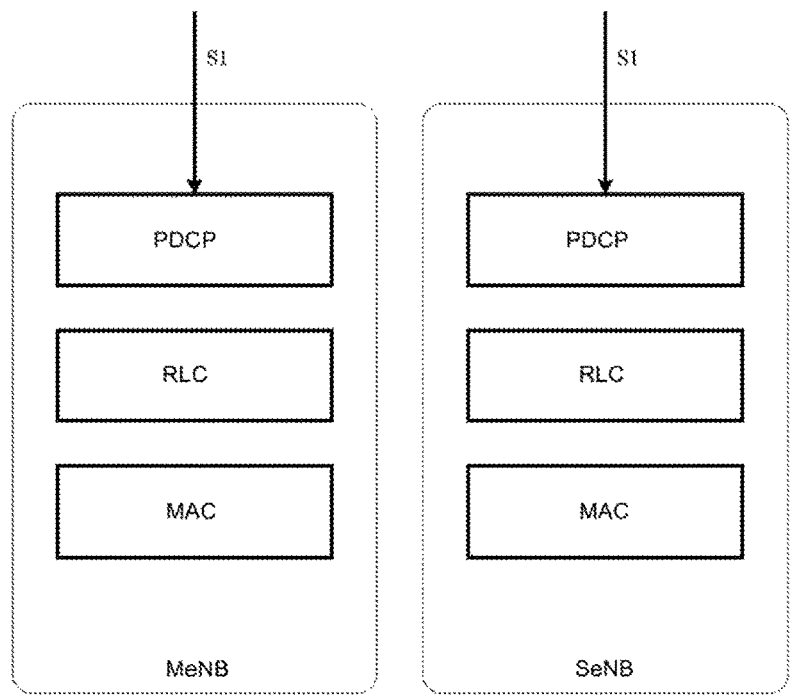
FIG. 2 is a schematic view showing a bearer separation architecture in the related art.
Figure 3:
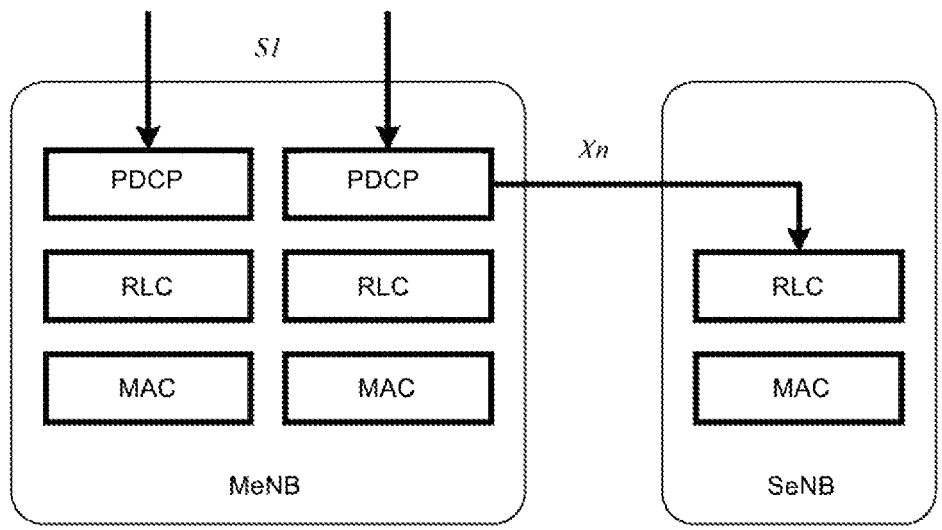
FIG. 3 is another schematic view showing the bearer separation architecture in the related art.
Figure 4:
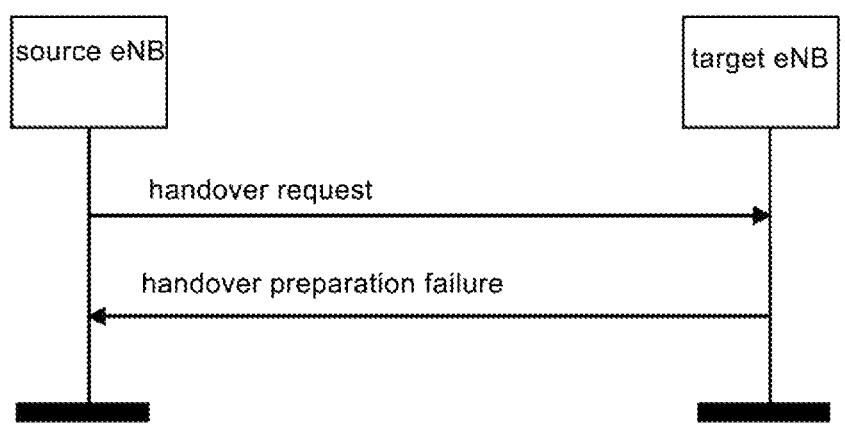
FIG. 4 is a schematic view showing a handover process between a source eNB and a target eNB in the related art.
Figure 5:
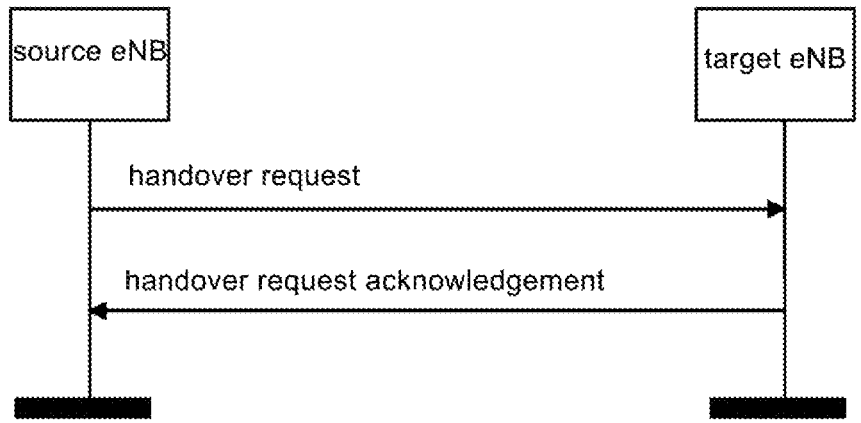
FIG. 5 is another schematic view showing the handover process between the source eNB and the target eNB in the related art.
Figure 6:
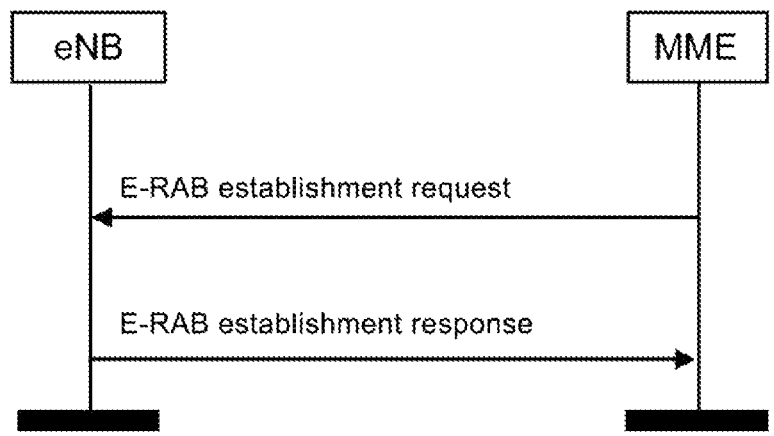
FIG. 6 is a schematic view showing bearer establishment in a non-handover process in the related art.

Step 701: after the MeNB decides to perform bearer separation, it may send a message (i.e., an SeNB addition request message) to the SeNB, and the message may carry information about a list of E-RABs desired for the bearer separation at the SeNB. The MeNB may notify the SeNB of whether or not the data is to be distributed for the uplink bearer. In the case that the data is not to be distributed for the uplink bearer (a state where the data is not distributed for bearer separation architecture in FIGS. 2 and 3, the same below), the MeNB may not indicate whether or not the uplink data is to be transmitted over the MeNB or the SeNB. In the case that the data is to be distributed for the uplink bearer (a state where the data is distributed for the bearer separation architecture in FIG. 2, the same below), the MeNB may not indicate the proportion of the uplink data to be transmitted over the MeNB and the proportion of the uplink data to be transmitted over the SeNB.

Step 702: upon the receipt of the message in Step 701, the SeNB may determine that, for which bearers in the list of the E-RABs, the uplink data is capable of being admitted or rejected. The SeNB may determine the bearers where the uplink data is to be transmitted and the bearers where no uplink data is to be transmitted, and send an uplink admission result of the bearers and a configuration thereof to the MeNB (e.g., the bearer admission result may be sent to the MeNB through an SeNB addition request acknowledgement message). In the case that the data is not to be distributed for the uplink bearer, the SeNB may indicate whether the uplink data for the bearers is to be transmitted over the SeNB or the MeNB. In the case that the data is to be distributed for the uplink bearer, the SeNB may indicate that a proportion of the uplink data to be transmitted over the MeNB and over the SeNB. The SeNB may provide any other auxiliary information (e.g., a load state of the SeNB) so as to facilitate the subsequent decision of the MeNB.

Step 703: upon the receipt of the bearer admission result of the SeNB, the MeNB may determine whether or not the bearer admission result of the SeNB is to be accepted. In the case that the bearer admission result has been accepted, the MeNB may, if necessary, configure connection for the UE in accordance with the bearer admission result (including a bearer configuration of the SeNB, and the direction or proportion of the data to be transmitted) of the SeNB acquired in Step 702, e.g., the connection for the UE may be configured through a RRC connection reconfiguration message. In the case that the MeNB is incapable of accepting the bearer admission result of the SeNB, it may send to the SeNB a message for rejecting the bearer admission result of the SeNB through Step 705 (at this time, the RRC connection reconfiguration message is not sent to the UE). In the case that the SeNB rejects to admit the uplink data for the bearer, the downlink data may still be transmitted over the SeNB.

Step 704: the UE may perform the connection configuration in accordance with the message received from the MeNB in Step 703, and after the connection configuration has been performed successfully, it may send a configuration completion message, e.g., a RRC connection reconfiguration completion message, to the MeNB.

Step 705: the MeNB may send an air-interface configuration completion result to the SeNB through, e.g., an SeNB reconfiguration completion message in accordance with the configuration completion message acquired in Step 704. The air-interface configuration completion result may include final air-interface configuration information of the UE. Optionally, the MeNB may send the message for rejecting the bearer admission result of the SeNB to the SeNB in accordance with a determination result in Step 703.

It should be appreciated that, for an SeNB bearer configuration modification process triggered by the MeNB, signaling sent by the MeNB to the SeNB in Step 701 is an SeNB modification request, and signaling sent by the SeNB to the MeNB in Step 702 is an SeNB modification request acknowledgement. However, the information related to the bearer admission in the signaling is identical to that in the SeNB addition process, and thus will not be particularly defined herein.

Second Embodiment

SeNB addition process for the addition of an SeNB (for an uplink bearer, the direction or proportion of the data to be transmitted is provided by the MeNB to the SeNB, and this direction or proportion is not rejected by the SeNB)

Figure 8:
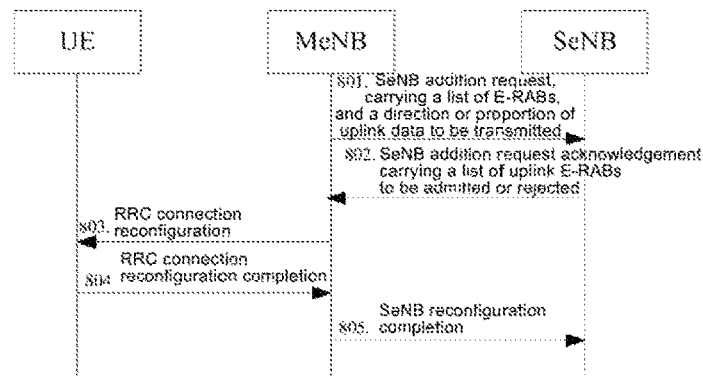
FIG. 8 is a flow chart of a bearer admission control method according to the second embodiment of the present disclosure.

Referring to FIG. 8, the present disclosure provides in this embodiment a bearer admission control method, which includes the following steps.

Step 801: in the case that the MeNB decides to perform the bearer separation, it may send a message (i.e., an SeNB addition request message) to the SeNB, and the message may carry information about a list of E-RABs desired for the bearer separation at the SeNB. The MeNB may notify the SeNB of whether or not the data is to be distributed for the uplink bearer. In the case that the data is not to be distributed for the uplink bearer, the MeNB may indicate whether or not the uplink data is to be transmitted over the MeNB or the SeNB. In the case that the data is to be distributed for the uplink bearer, the MeNB may indicate the proportion of the uplink data to be transmitted over the MeNB and over the SeNB.

Step 802: upon the receipt of the message in Step 801, the SeNB may determine that, for which bearers in the list of the E-RABs, the uplink data is capable of being admitted or rejected, if in Step 801 the MeNB has indicated that the uplink data is to be transmitted over the SeNB in the case that the data is not to be distributed for the uplink bearer or the MeNB has indicated the proportion of the uplink data to be transmitted over the MeNB and over the SeNB in the case that the data is to be distributed for the uplink bearer. There are two types of bearers, i.e., the bearers where the uplink data is to be transmitted, and the bearers where no uplink data is to be transmitted. The SeNB may perform the configuration with respect to the two types of the bearers, and send an uplink admission result of the bearers and the configuration thereof to the MeNB (e.g., the bearer admission result may be sent to the MeNB through an SeNB addition request acknowledgement message). The SeNB may also provide any other auxiliary information (e.g., a load state of the SeNB) so as to facilitate the subsequent decision of the MeNB.

Step 803: upon the receipt of the bearer admission result of the SeNB, the MeNB may determine whether or not the bearer admission result of the SeNB is to be accepted. In the case that the bearer admission result has been accepted, the MeNB may, if necessary, configure connection for the UE in accordance with the bearer admission result (including a bearer configuration of the SeNB) of the SeNB acquired in Step 802, e.g., the connection for the UE may be configured through a RRC connection reconfiguration message. In addition, the MeNB may also modify the direction or proportion of the uplink data to be transmitted in accordance with the bearer admission result of the SeNB acquired in Step 802. For example, for the uplink bearer not admitted by the SeNB, the MeNB may modify the uplink data for the bear as to be transmitted over the MeNB. In the case that the MeNB is incapable of accepting the uplink bearer rejected by the SeNB, it may perform Step 805, i.e., send a message for rejecting the bearer admission result of the SeNB to the SeNB. In the case of configuring the connection for the UE, the MeNB may select not to perform the bearer separation for the SeNB, or select to release the bearer. In the case that the SeNB rejects to admit the uplink data for the bearer, the downlink data may still be transmitted over the SeNB.

Step 804: the UE may perform the connection configuration in accordance with the message received from the MeNB in Step 803, and after the connection configuration has been performed successfully, it may send a configuration completion message, e.g., a RRC connection reconfiguration completion message, to the MeNB.

Step 805: the MeNB may send an air-interface configuration completion result to the SeNB through, e.g., an SeNB reconfiguration completion message, in accordance with the configuration completion message in Step 804. The air-interface configuration completion result may include final air-interface configuration information of the UE. Optionally, the MeNB may send the message for rejecting the bearer admission result of the SeNB to the SeNB in accordance with a determination result in Step 803.

It should be appreciated that, for an SeNB bearer configuration modification process triggered by the MeNB, signaling sent by the MeNB to the SeNB in Step 801 is an SeNB modification request, and signaling sent by the SeNB to the MeNB in Step 802 is an SeNB modification request acknowledgement. However, the information related to the bearer admission in the signaling is identical to that in the SeNB addition process, and thus will not be particularly defined herein.

Third Embodiment

SeNB addition process for the addition of an SeNB (for an uplink bearer, the direction or proportion of the data to be transmitted is provided by the MeNB to the SeNB, and this direction or proportion is rejected by the SeNB)

Figure 9:
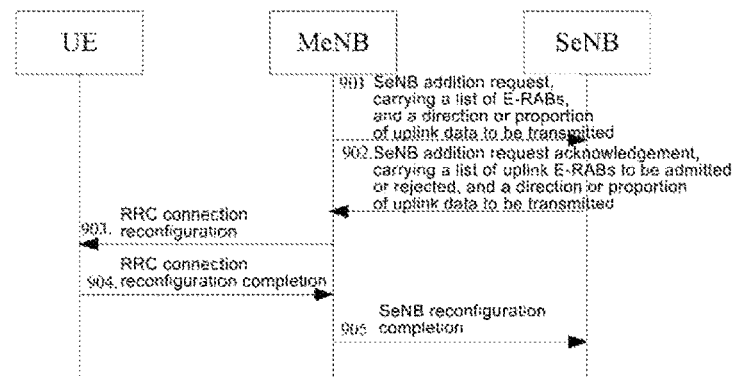
FIG. 9 is a flow chart of a bearer admission control method according to the third embodiment of the present disclosure.

Referring to FIG. 9, the present disclosure provides in this embodiment a bearer admission control method, which includes the following steps.

Step 901: after the MeNB decides to perform bearer separation, it may send a message (i.e., an SeNB addition request message) to the SeNB, and the message may carry information about a list of E-RABs desired for the bearer separation at the SeNB. The MeNB may notify the SeNB of whether or not the data is to be distributed for the uplink bearer. In the case that the data is not to be distributed for the uplink bearer, the MeNB may indicate whether or not the uplink data is to be transmitted over the MeNB or the SeNB. In the case that the data is to be distributed for the uplink bearer, the MeNB may indicate the proportion of the uplink data to be transmitted over the MeNB and to be transmitted over the SeNB.

Step 902: upon the receipt of the message in Step 901, the SeNB may determine that, for which bearers in the list of the E-RABs, the uplink data is capable of being admitted, if in Step 901 the MeNB has indicated that the uplink data is to be transmitted over the SeNB in the case that the data is not to be distributed for the uplink bearer or the MeNB has indicated the proportion of the uplink data to be transmitted over the MeNB and to be transmitted over the SeNB in the case that the data is to be distributed for the uplink bearer. The SeNB may determine the bearers where the uplink data is to be transmitted and the bearers where no uplink data is to be transmitted. For the bearer incapable of being admitted by the SeNB, the uplink data may be changed to be transmitted over the MeNB in the case that the data is not to be distributed for the uplink bearer, and the proportion of the uplink data to be transmitted may be changed in the case that the data is to be distributed for the uplink bearer. In addition, the SeNB may send the bearer configuration and the bearer admission result of the SeNB to the MeNB (e.g., the bearer admission result may be sent to the MeNB through an SeNB addition request acknowledgement message). The SeNB may also provide any other auxiliary information (e.g., a load state of the SeNB) so as to facilitate the subsequent decision of the MeNB.

Step 903: upon the receipt of the bearer admission result of the SeNB, the MeNB may determine whether or not the bearer admission result of the SeNB is to be accepted. In the case that the bearer admission result has been accepted, the MeNB may, if necessary, configure connection for the UE in accordance with the bearer admission result (including a bearer configuration of the SeNB, and the direction or proportion of the uplink data to be transmitted) of the SeNB acquired in Step 902, e.g., the connection for the UE may be configured through a RRC connection reconfiguration message. In the case that the MeNB is incapable of accepting the bearer admission result of the SeNB, it may perform Step 905, i.e., send a message for rejecting the bearer admission result of the SeNB to the SeNB (at this time, the RRC connection reconfiguration message is not sent to the UE).

In the case that the SeNB rejects to admit the uplink data for the bearer, the downlink data may still be transmitted over the SeNB.

Step 904: the UE may perform the connection configuration in accordance with the message received from the MeNB in Step 903, and after the connection configuration has been performed successfully, it may send a configuration completion message, e.g., a RRC connection reconfiguration completion message, to the MeNB.

Step 905: the MeNB may send an air-interface configuration completion result to the SeNB through, e.g., an SeNB reconfiguration completion message, in accordance with the configuration completion message acquired in Step 904. The air-interface configuration completion result may include final air-interface configuration information of the UE. Optionally, the MeNB may send the message for rejecting the bearer admission result of the SeNB to the SeNB in accordance with a determination result in Step 903.

It should be appreciated that, for an SeNB bearer configuration modification process triggered by the MeNB, signaling sent by the MeNB to the SeNB in Step 901 is an SeNB modification request, and signaling sent by the SeNB to the MeNB in Step 902 is an SeNB modification request acknowledgement. However, the information related to the bearer admission in the signaling is identical to that in the SeNB addition process, and thus will not be particularly defined herein.

Fourth Embodiment

SeNB modification process for the modification of a UE configuration on an SeNB (the data is not to be distributed for an uplink bearer, and the SeNB may initiate a direction rejection request)

Figure 10:
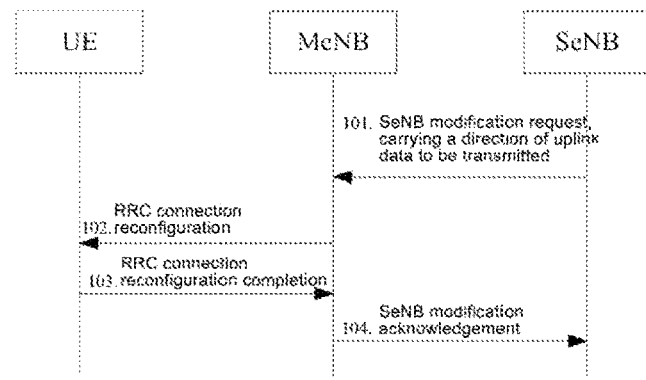
FIG. 10 is a flow chart of a bearer admission control method according to the fourth embodiment of the present disclosure.

Referring to FIG. 10, the present disclosure provides in this embodiment a bearer admission control method, which includes the following steps.

Step 101: in the case that the data is not to be distributed for the uplink bearer, the SeNB may send an uplink data transmission direction change request (e.g., a request for transmitting the uplink data over the MeNB) to the MeNB when the uplink data transmission direction needs to be changed (e.g., when uplink congestion occurs). In addition, the SeNB may send to the MeNB a bearer configuration (e.g., an SeNB modification request message) required after the uplink data transmission direction has been changed. In addition, the SeNB may provide any other auxiliary information (e.g., a load state of the SeNB) so as to facilitate the subsequent decision of the MeNB.

Step 102: upon the receipt of the uplink data transmission direction change request from the SeNB, the MeNB may determine whether or not the uplink data transmission direction change request is to be accepted. In the case that the direction change request has been accepted, the MeNB may, if necessary, configure connection for the UE in accordance with the uplink data transmission direction change request acquired in Step 101, e.g., the connection for the UE may be configured through a RRC connection reconfiguration message. In the case that the MeNB is incapable of accepting the uplink data transmission direction change request, it may send to the SeNB a message for rejecting the uplink data transmission direction change request through Step 104. In the case that the SeNB rejects to admit the uplink data for the bearer, the downlink data may still be transmitted over the SeNB.

Step 103: the UE may perform the connection configuration in accordance with the message received from the MeNB in Step 102, and after the connection configuration has been performed successfully, it may send a configuration completion message, e.g., a RRC connection reconfiguration completion message, to the MeNB.

Step 104: the MeNB may send an air-interface configuration completion result to the SeNB through, e.g., an SeNB reconfiguration completion message, in accordance with the configuration completion message acquired in Step 103. The air-interface configuration completion result may include final air-interface configuration information of the UE. Optionally, the MeNB may send the message for rejecting the direction change request to the SeNB in accordance with a determination result in Step 102.

Fifth Embodiment

SeNB modification process for the modification of a UE configuration on an SeNB (the data is to be distributed for an uplink bearer, and the SeNB may initiate a request for changing an uplink data transmission proportion change request)

Figure 11:
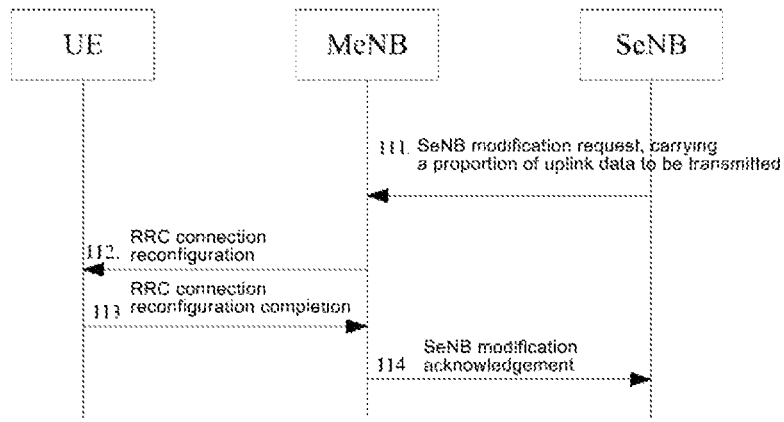

Referring to FIG. 11, the present disclosure provides in this embodiment a bearer admission control method, which includes the following steps.

Step 111: in the case that the data is to be distributed for the uplink bearer, the SeNB may send an uplink data transmission proportion change request (e.g., a new uplink data transmission proportion) to the MeNB when the uplink data transmission proportion needs to be changed. In addition, the SeNB may send to the MeNB, e.g., through an SeNB modification request message, a bearer configuration required after the uplink data transmission proportion has been changed. The SeNB may provide any other auxiliary information (e.g., a load state of the SeNB) so as to facilitate the subsequent decision of the MeNB.

Step 112: upon the receipt of the uplink data transmission proportion change request from the SeNB, the MeNB may determine whether or not the uplink data transmission proportion change request is to be accepted. In the case that the proportion change request has been accepted, the MeNB may, if necessary, configure connection for the UE in accordance with the proportion change request acquired in Step 111, e.g., the connection for the UE may be configured through a RRC connection reconfiguration message. In the case that the MeNB is incapable of accepting proportion change request acquired in Step 111, it may send to the SeNB a message for rejecting the proportion change request through Step 144.

Step 113: the UE may perform the connection configuration in accordance with the message received from the MeNB in Step 112, and after the connection configuration has been performed successfully, it may send a configuration completion message, e.g., a RRC connection reconfiguration completion message, to the MeNB.

Step 114: the MeNB may send an air-interface configuration completion result to the SeNB through, e.g., an SeNB modification completion message, in accordance with the configuration completion message acquired in Step 113. The air-interface configuration completion result may include final air-interface configuration information of the UE. Optionally, the MeNB may send the message for rejecting proportion change request to the SeNB in accordance with a determination result in Step 112.

Sixth Embodiment

SeNB addition process for the addition of an SeNB (for a downlink bearer, a data transmission direction is not provided by the MeNB to the SeNB, and instead the data transmission direction is determined by the SeNB itself)

Figure 12:
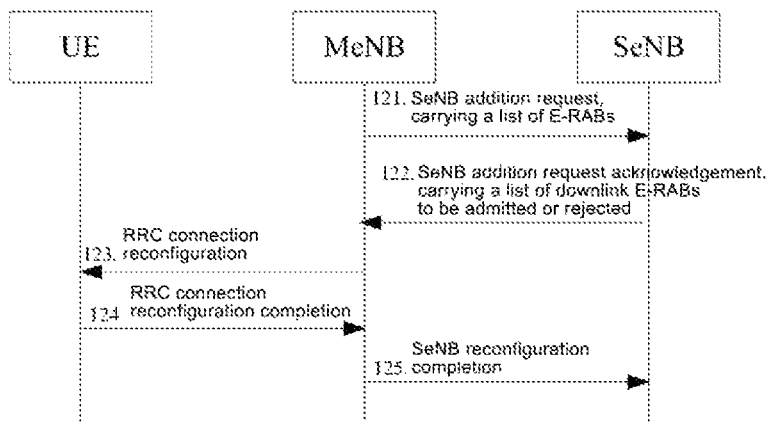
FIG. 12 is a flow chart of a bearer admission control method according to the fifth embodiment of the present disclosure.

Referring to FIG. 12, the present disclosure provides in this embodiment a bearer admission control method, which includes the following steps.

Step 121: after the MeNB decides to perform the bearer separation, it may send a message, e.g., an SeNB addition request message, to the SeNB, and the message may carry information about a list of E-RABs for the bearer separation at the SeNB. The MeNB may notify the SeNB of whether or not the data is to be distributed for the downlink bearer.

Step 122: upon the receipt of the message in Step 121, the SeNB may determine that, for which bearers in the list of the E-RABs, the downlink data is capable of being admitted or rejected. The SeNB may determine the bearers where the downlink data is to be transmitted and the bearers where no downlink data is to be transmitted, perform configurations with respect to the two types of bearers respectively, and send a downlink admission result of the bearers and configurations thereof to the MeNB (e.g., through an SeNB addition request acknowledgement message). Next, with respect to the downlink bearer not admitted, the SeNB may not send to the MeNB a feedback message about the transmission of the downlink data for the downlink bearer, e.g., the SeNB may not periodically send a downlink data buffer sate for the bearer to the MeNB. The SeNB may provide any other auxiliary information (e.g., a load state of the SeNB) so as to facilitate the subsequent decision of the MeNB.

Step 123: upon the receipt of the bearer admission result of the SeNB, the MeNB may determine whether or not the bearer admission result of the SeNB is to be accepted. In the case that the bearer admission result has been accepted, the MeNB may, if necessary, configure connection for the UE in accordance with the bearer admission result (including a bearer configuration of the SeNB) of the SeNB acquired in Step 122, e.g., the connection for the UE may be configured through a RRC connection reconfiguration message. Next, with respect to the downlink bearer not admitted, the MeNB may not send the downlink data for the bearer to the SeNB. In the case that the MeNB is incapable of accepting the bearer admission result of the SeNB, the MeNB may send a message for rejecting the bearer admission result of the SeNB through Step 125 (at this time, no RRC connection reconfiguration message is sent to the UE). In the case that the SeNB rejects to admit the downlink data for the bearer, the uplink data may still be transmitted over the SeNB.

Step 124: the UE may perform the connection configuration in accordance with the message received from the MeNB in Step 123, and after the connection configuration has been performed successfully, it may send a configuration completion message, e.g., a RRC connection reconfiguration completion message, to the MeNB.

Step 125: the MeNB may send an air-interface configuration completion result to the SeNB through, e.g., an SeNB reconfiguration completion message, in accordance with the configuration completion message acquired in Step 124. The air-interface configuration completion result may include final air-interface configuration information of the UE. Optionally, the MeNB may send the message for rejecting the bearer admission result of the SeNB to the SeNB in accordance with a determination result in Step 123.

It should be appreciated that, for an SeNB bearer configuration modification process triggered by the MeNB, signaling sent by the MeNB to the SeNB in Step 121 is an SeNB modification request, and signaling sent by the SeNB to the MeNB in Step 122 is an SeNB modification request acknowledgement. However, the information related to the bearer admission in the signaling is identical to that in the SeNB addition process, and thus will not be particularly defined herein.

Seventh Embodiment

SeNB addition process for the addition of an SeNB (for a downlink bearer, a data transmission direction is provided by the MeNB to the SeNB, and the this data transmission direction is not changed at the SeNB)

Figure 13:
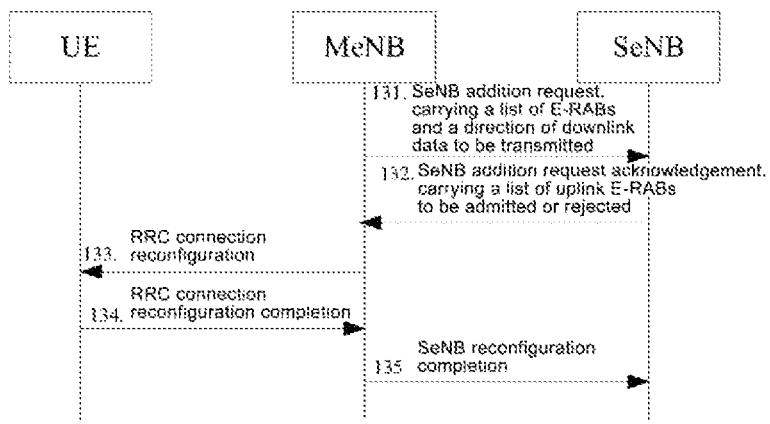
FIG. 13 is a flow chart of a bearer admission control method according to the seventh embodiment of the present disclosure.

Referring to FIG. 13, the present disclosure provides in this embodiment a bearer admission control method, which includes the following steps.

Step 131: after the MeNB decides to perform the bearer separation, it may send a message, e.g., an SeNB addition request message, to the SeNB, and the message may carry information about a list of E-RABs desired for the bearer separation at the SeNB. The MeNB may notify the SeNB of whether or not the data is to be distributed for the downlink bearer. In the case that the data is to be distributed or not to be distributed for the downlink bearer, the MeNB may indicate a downlink data transmission direction, i.e., whether or not the downlink data is to be transmitted over the MeNB or the SeNB.

Step 132: upon the receipt of the message in Step 131, the SeNB may determine that, for which bearers in the list of the E-RABs, the downlink data is capable of being admitted or rejected. The SeNB may determine the bearers where the downlink data is to be transmitted and the bearers where no downlink data is to be transmitted, perform configurations with respect to the two types of bearers respectively, and send a downlink admission result of the bearers and configurations thereof, as the bearer admission result of the SeNB, to the MeNB (e.g., through an SeNB addition request acknowledgement message). The SeNB may provide any other auxiliary information (e.g., a load state of the SeNB) so as to facilitate the subsequent decision of the MeNB.

Step 133: upon the receipt of the bearer admission result of the SeNB, the MeNB may determine whether or not the bearer admission result of the SeNB is to be accepted. In the case that the bearer admission result has been accepted, the MeNB may, if necessary, configure connection for the UE in accordance with the bearer admission result (including a bearer configuration of the SeNB) of the SeNB acquired in Step 132, e.g., the connection for the UE may be configured through a RRC connection reconfiguration message. In addition, the MeNB may modify the downlink data transmission direction or proportion in accordance with the bearer admission result of the SeNB acquired in Step 132 (e.g., for the downlink bearer not admitted by the SeNB, the MeNB may modify the downlink data transmission direction as to be transmitted over the MeNB). In the case that the MeNB is incapable of accepting the bearer admission result of the SeNB, it may send to the SeNB a message for rejecting the bearer admission result of the SeNB through Step 135 (at this time, the RRC connection reconfiguration message is not sent to the UE). For the downlink bearer rejected by the SeNB, during the connection configuration for the UE, the MeNB may select not to perform the bearer separation at the SeNB, or select to release the bearer. In the case that the SeNB rejects to admit the downlink data for the bearer, the uplink data may still be transmitted over the SeNB.

Step 134: the UE may perform the connection configuration in accordance with the message received from the MeNB in Step 133, and after the connection configuration has been performed successfully, it may send a configuration completion message, e.g., a RRC connection reconfiguration completion message, to the MeNB.

Step 135: the MeNB may send an air-interface configuration completion result to the SeNB through, e.g., an SeNB reconfiguration completion message in accordance with the configuration completion message acquired in Step 134. The air-interface configuration completion result may include final air-interface configuration information of the UE. Optionally, the MeNB may send the message for rejecting the bearer admission result of the SeNB to the SeNB in accordance with a determination result in Step 133.

It should be appreciated that, for an SeNB bearer configuration modification process triggered by the MeNB, signaling sent by the MeNB to the SeNB in Step 131 is an SeNB modification request, and signaling sent by the SeNB to the MeNB in Step 132 is an SeNB modification request acknowledgement. However, the information related to the bearer admission in the signaling is identical to that in the SeNB addition process, and thus will not be particularly defined herein.

Eighth Embodiment

SeNB addition process for the addition of an SeNB (for a downlink bearer, a data transmission direction is provided by the MeNB to the SeNB, but this data transmission direction is rejected by the SeNB)

Figure 14:
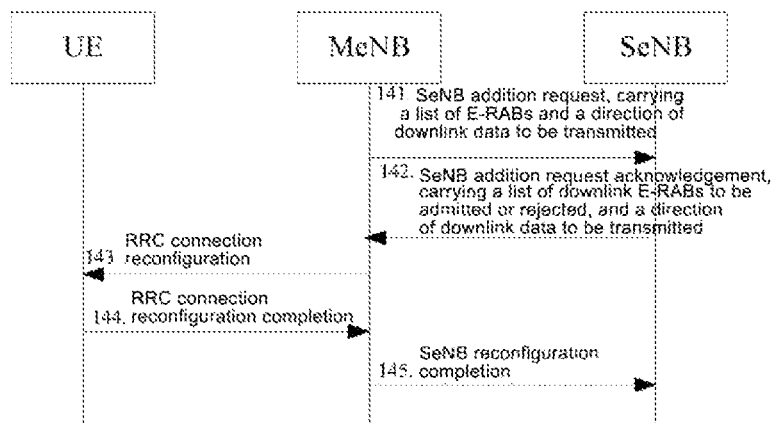
FIG. 14 is a flow chart of a bearer admission control method according to the eighth embodiment of the present disclosure.

Referring to FIG. 14, the present disclosure provides in this embodiment a bearer admission control method, which includes the following steps.

Step 141: after the MeNB decides to perform bearer separation, it may send a message (i.e., an SeNB addition request message) to the SeNB, and the message may carry information about a list of E-RABs desired for the bearer separation at the SeNB. The MeNB may notify the SeNB of whether or not the data is to be distributed for the downlink bearer. In the case that the data is to be distributed or not to be distributed for the downlink bearer, the MeNB may indicate the downlink data transmission direction, i.e., whether or not the downlink data is to be transmitted over the MeNB or the SeNB.

Step 142: upon the receipt of the message in Step 141, the SeNB may determine that, for which bearers in the list of the E-RABs, the downlink data is capable of being admitted. The SeNB may determine the bearers where the downlink data is to be transmitted and the bearers where no downlink data is to be transmitted. For the bearer not admitted by the SeNB, the SeNB may change the downlink data transmission direction to be transmitted over the MeNB, and send the bearer admission result of the SeNB (including the bearer configuration) to the MeNB (e.g., through an SeNB addition request acknowledgement message). The SeNB may provide any other auxiliary information (e.g., a load state of the SeNB) so as to facilitate the subsequent decision of the MeNB.

Step 143: upon the receipt of the bearer admission result of the SeNB, the MeNB may determine whether or not the bearer admission result of the SeNB is to be accepted. In the case that the bearer admission result has been accepted, the MeNB may, if necessary, configure connection for the UE in accordance with the bearer admission result (including a bearer configuration of the SeNB and the downlink data transmission direction) of the SeNB acquired in Step 142, e.g., the connection for the UE may be configured through a RRC connection reconfiguration message. In the case that the MeNB is incapable of accepting the bearer admission result of the SeNB, it may send to the SeNB a message for rejecting the bearer admission result of the SeNB through Step 145 (at this time, the RRC connection reconfiguration message is not sent to the UE). In the case that the SeNB rejects to admit the downlink data for the bearer, the uplink data may still be transmitted over the SeNB.

Step 144: the UE may perform the connection configuration in accordance with the message received from the MeNB in Step 143, and after the connection configuration has been performed successfully, it may send a configuration completion message, e.g., a RRC connection reconfiguration completion message, to the MeNB.

Step 145: the MeNB may send an air-interface configuration completion result to the SeNB through, e.g., an SeNB reconfiguration completion message in accordance with the configuration completion message acquired in Step 144. The air-interface configuration completion result may include final air-interface configuration information of the UE. Optionally, the MeNB may send the message for rejecting the bearer admission result of the SeNB to the SeNB in accordance with a determination result in Step 143.

For an SeNB bearer configuration modification process triggered by the MeNB, signaling sent by the MeNB to the SeNB in Step 141 is an SeNB modification request, and signaling sent by the SeNB to the MeNB in Step 142 is an SeNB modification request acknowledgement. However, the information related to the bearer admission in the signaling is identical to that in the SeNB addition process, and thus will not be particularly defined herein.

Ninth Embodiment

SeNB modification process for the modification of a UE configuration on an SeNB (for a downlink bearer, the SeNB initiates a direction rejection request)

Figure 15:
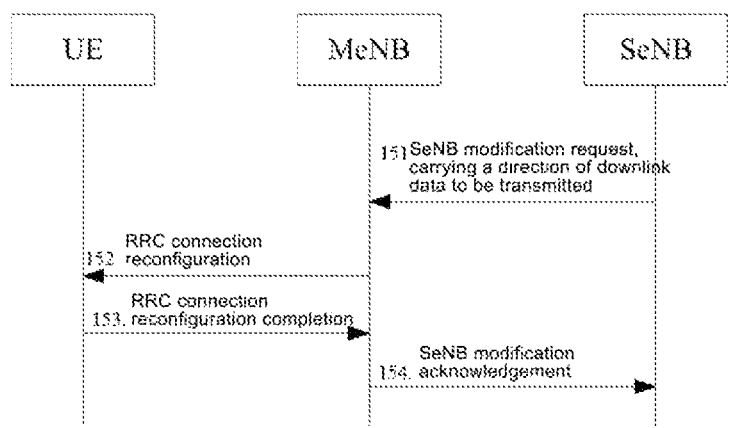
FIG. 15 is a flow chart of a bearer admission control method according to the ninth embodiment of the present disclosure.

Referring to FIG. 15, the present disclosure provides in this embodiment a bearer admission control method, which includes the following steps.

Step 151: for the downlink bearer, in the case that the downlink data is changed to be transmitted over the MeNB (e.g., in the case of downlink congestion), the SeNB may send a downlink data transmission direction change request to the MeNB (e.g., the SeNB may send a request for transmitting the downlink data over the MeNB to the MeNB, and in the case that the data is to be distributed for the downlink bearer, information about the data transmission direction change request may be information about the downlink data transmission proportion, e.g., a percentage of the downlink data to be transmitted over the SeNB may be set to "0"). In addition, the SeNB may send to the MeNB a bearer configuration (e.g., an SeNB modification request message) desired after the downlink data transmission direction has been changed. Next, for the downlink bearer where the data is merely transmitted over the MeNB, the SeNB may not send to the MeNB a feedback message about the transmission of the downlink data for the bearer (e.g., the SeNB may not periodically send a downlink data buffer state for the bearer to the MeNB). The SeNB may provide any other auxiliary information (e.g., a load state of the SeNB) so as to facilitate the subsequent decision of the MeNB.

Step 152: upon the receipt of the downlink data transmission direction change request from the SeNB, the MeNB may determine whether or not the direction change request is to be accepted. In the case that the direction change request has been accepted, the MeNB may, if necessary, configure connection for the UE in accordance with the direction change request acquired in Step 151, e.g., the connection for the UE may be configured through a RRC connection reconfiguration message. Next, with respect to the downlink bearer where the data is changed to be merely transmitted over the MeNB, the MeNB may not send the downlink data for the bearer to the SeNB. In the case that the MeNB is incapable of accepting the direction change request, the MeNB may send a message for rejecting the direction change request through Step 154. In the case that the SeNB rejects to admit the downlink data for the bearer, the uplink data may still be transmitted over the SeNB.

Step 153: the UE may perform the connection configuration in accordance with the message received from the MeNB in Step 152, and after the connection configuration has been performed successfully, it may send a configuration completion message, e.g., a RRC connection reconfiguration completion message, to the MeNB.

Step 154: the MeNB may send an air-interface configuration completion result to the SeNB through, e.g., an SeNB reconfiguration completion message, in accordance with the configuration completion message acquired in Step 153. The air-interface configuration completion result may include final air-interface configuration information of the UE. Optionally, the MeNB may send the message for rejecting the direction change request to the SeNB in accordance with a determination result in Step 152.

Figure 16:
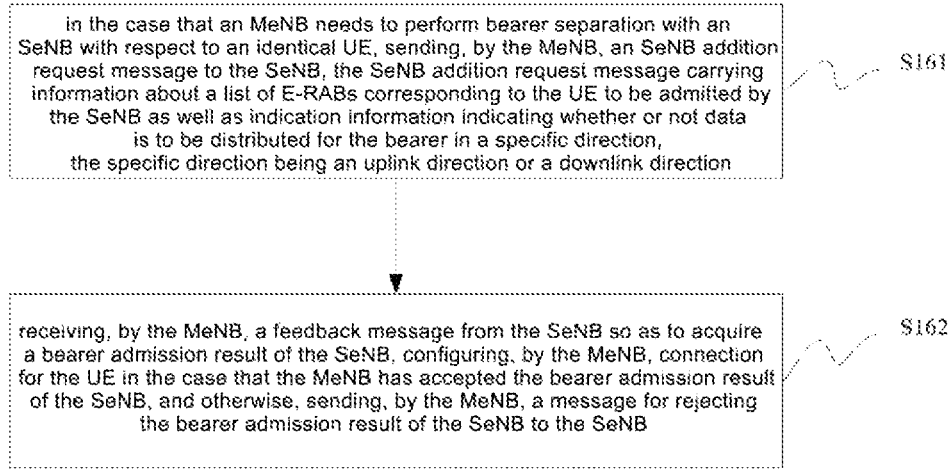
FIG. 16 is an overall flow chart of the bearer admission control method at an MeNB side according to one embodiment of the present disclosure.

It is found that, the present disclosure provides in some embodiments a bearer admission control method at an MeNB side which, as shown in FIG. 16, may include: Step S161 of, in the case that an MeNB needs to perform bearer separation with an SeNB with respect to an identical UE, sending, by the MeNB, an SeNB addition request message to the SeNB, the SeNB addition request message carrying information about a list of E-RABs corresponding to the UE to be admitted by the SeNB as well as indication information indicating whether or not data is to be distributed for the bearer in a specific direction, the specific direction being an uplink direction or a downlink direction; and Step S162 of receiving, by the MeNB, a feedback message from the SeNB so as to acquire a bearer admission result of the SeNB, configuring, by the MeNB, connection for the UE in the case that the MeNB has accepted the bearer admission result of the SeNB, and otherwise, sending, by the MeNB, a message for rejecting the bearer admission result of the SeNB to the SeNB.

According to the bearer admission control method in the embodiments of the present disclosure, in the case that the MeNB needs to perform the bearer separation with the SeNB with respect to the same UE and the SeNB needs to be added, it may indicate the SeNB whether or not the data is to be distributed for the bearer in the uplink or downlink direction. Next, the SeNB may send the message for indicating the bearer admission result, i.e., whether or not an uplink or downlink bearer is to be admitted, to the MeNB, so as to enable the eNB to selectively admit the uplink or downlink bearer of the UE, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

Optionally, the bearer admission result of the SeNB includes: a bearer in the specific direction to be admitted or rejected by the SeNB; indication information indicating the data of the UE in the specific direction to be transmitted over the SeNB or the MeNB for the bearers admitted by the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction.

Optionally, the SeNB addition request message further includes indication information indicating whether the data of the UE in the specific direction is to be transmitted over the MeNB or the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction. The bearer admission result of the SeNB includes a bearer in the specific direction to be admitted or rejected by the SeNB.

Optionally, the bearer admission result of the SeNB further includes: in respect to a bearer in the specific direction incapable of being admitted by the SeNB, change information about the data of the UE in the specific direction to be transmitted over the MeNB in the case that the data is not to be distributed for the bearer in the specific direction; and change information about a proportion of the data of the UE in the specific direction to be transmitted over the SeNB in the case that the data is to be distributed for the bearer in the specific direction.

Optionally, in the case that the admission of the bearer in the specific direction has been rejected by the SeNB, the SeNB does not feed back to the MeNB a data transmission state of the UE in the specific direction.

Optionally, the bearer admission control method further includes: receiving, by the MeNB, a direction change request from the SeNB, the direction change request indicating change information about the data of the UE in the specific direction to be transmitted over the MeNB in the case that the data is not to be distributed for the bearer in the specific direction; and in the case that the MeNB has accepted the direction change request from the SeNB, configuring, by the MeNB, the connection for the UE, and otherwise, sending, by the MeNB, a message for rejecting the direction change request to the SeNB.

Optionally, the bearer admission control method further includes: receiving, by the MeNB, a proportion change request from the SeNB, the proportion change request indicating change information about the proportion of the data of the UE in the specific direction to be transmitted over the MeNB and/or the proportion of the data of the UE in the specific direction to be transmitted over the SeNB in the case that the data is to be distributed for the bearer in the specific direction; and in the case that the MeNB has accepted the proportion change request from the SeNB, configuring, by the MeNB, the connection for the UE, and otherwise sending, by the MeNB, a message for rejecting the proportion change request to the SeNB.

Figure 17:
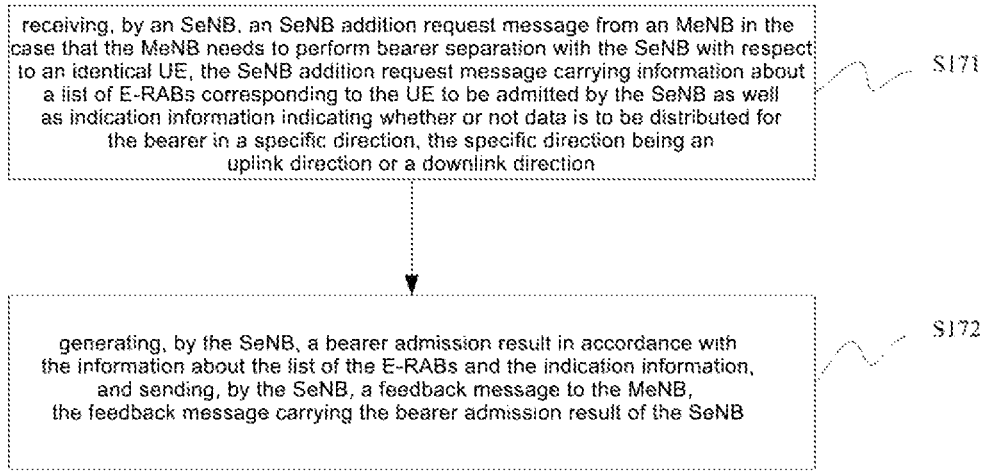
FIG. 17 is an overall flow chart of the bearer admission control method at an SeNB side according to one embodiment of the present disclosure.

Corresponding to the bearer admission control method at the MeNB side, the present disclosure further provides in some embodiments a bearer admission control method at an SeNB side which, as shown in FIG. 17, may include: Step S171 of, receiving, by an SeNB, an SeNB addition request message from an MeNB in the case that the MeNB needs to perform bearer separation with the SeNB with respect to an identical UE, acquiring, from the SeNB addition request message, information about a list of E-RABs corresponding to the UE to be admitted by the SeNB as well as indication information indicating whether or not data is to be distributed for the bearer in a specific direction, the specific direction being an uplink direction or a downlink direction; and Step S172 of generating, by the SeNB, a bearer admission result in accordance with the information about the list of the E-RABs and the indication information, and sending, by the SeNB, a feedback message to the MeNB, the feedback message carrying the bearer admission result of the SeNB.

According to the bearer admission control method in the embodiments of the present disclosure, in the case that the MeNB needs to perform the bearer separation with the SeNB with respect to the same UE and the SeNB needs to be added, the SeNB may receive the indication information indicating whether or not the data is to be distributed for the bearer in the uplink or downlink direction, and send the message for indicating the bearer admission result, i.e., whether or not an uplink or downlink bearer is to be admitted, to the MeNB, so as to enable the eNB to selectively admit the uplink or downlink bearer of the UE, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

Optionally, the bearer admission result includes: a bearer in the specific direction to be admitted or rejected by the SeNB; indication information indicating the data of the UE in the specific direction to be transmitted over the SeNB or the MeNB for the bearers admitted by the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction.

Optionally, the SeNB addition request message further includes indication information indicating whether the data of the UE in the specific direction is to be transmitted over the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction. The bearer admission result of the SeNB includes a bearer in the specific direction to be admitted or rejected by the SeNB.

Optionally, the bearer admission result of the SeNB further includes: a bearer in the specific direction incapable of being admitted by the SeNB; change information about the data of the UE in the specific direction to be transmitted over the MeNB in the case that the data is not to be distributed for the bearer in the specific direction; and change information about a proportion of the data of the UE in the specific direction to be transmitted over the SeNB in the case that the data is to be distributed for the bearer in the specific direction.

Optionally, in the case that the admission of the bearer in the specific direction has been rejected by the SeNB, the SeNB does not feed back to the MeNB a data transmission state of the UE in the specific direction.

Optionally, the bearer admission control method further includes, when the data of the UE in the specific direction is changed to be transmitted over the MeNB, sending, by the SeNB, a direction change request to the MeNB, the direction change request carrying change information about the data of the UE in the specific direction to be transmitted over the MeNB in the case that the data is not to be distributed for the bearer in the specific direction.

Optionally, the bearer admission control method further includes, in the case that the proportion of the data of the UE in the specific direction to be transmitted over the MeNB and the proportion of the data of the UE in the specific direction to be transmitted over the SeNB need to be changed, sending, by the SeNB, a proportion change request to the MeNB, the proportion change request carrying change information about the proportion of the data of the UE in the specific direction to be transmitted over the MeNB and/or the proportion of the data of the UE in the specific direction to be transmitted over the SeNB in the case that the data is to be distributed for the bearer in the specific direction.

Figure 18:
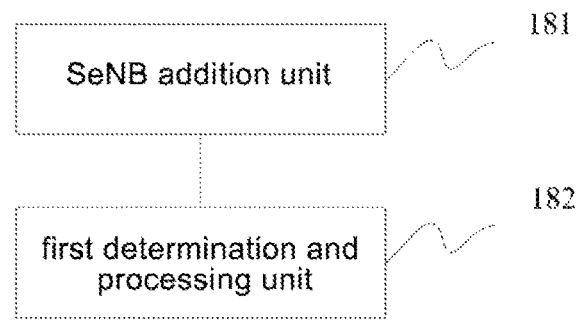
FIG. 18 is a schematic view showing a bearer admission control apparatus according to one embodiment of the present disclosure.

Based on the above-mentioned bearer admission control methods, the present disclosure further provides in some embodiments a bearer admission control apparatus. In the case that the apparatus is used at an MeNB side, as shown in FIG. 18, it may include: an SeNB addition unit 181 configured to, in the case that an MeNB needs to perform bearer separation with an SeNB with respect to an identical UE, send an SeNB addition request message to the SeNB, the SeNB addition request message carrying information about a list of E-RABs corresponding to the UE to be admitted by the SeNB as well as indication information indicating whether or not data is to be distributed for the bearer in a specific direction, the specific direction being an uplink direction or a downlink direction; and a first determination and processing unit 182 configured to receive a feedback message from the SeNB so as to acquire a bearer admission result of the SeNB, configure connection for the UE in the case that the bearer admission result of the SeNB has been accepted, and otherwise, send a message for rejecting the bearer admission result of the SeNB to the SeNB.

According to the bearer admission control apparatus in the embodiments of the present disclosure, in the case that the MeNB needs to perform the bearer separation with the SeNB with respect to the same UE and the SeNB needs to be added, it may indicate the SeNB whether or not the data is to be distributed for the bearer in the uplink or downlink direction. Next, the SeNB may send the message for indicating the bearer admission result, i.e., whether or not an uplink or downlink bearer is to be admitted, to the MeNB, so as to enable the eNB to selectively admit the uplink or downlink bearer of the UE, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

Optionally, the bearer admission result of the SeNB includes: a bearer in the specific direction to be admitted or rejected by the SeNB; indication information indicating the data of the UE in the specific direction to be transmitted over the SeNB or the MeNB for the bearers admitted by the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction.

Optionally, the SeNB addition request message further includes indication information indicating whether the data of the UE in the specific direction is to be transmitted over the MeNB or the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction. The bearer admission result of the SeNB includes a bearer in the specific direction to be admitted or rejected by the SeNB.

Optionally, the bearer admission result of the SeNB further includes: in respect to a bearer in the specific direction incapable of being admitted by the SeNB, change information about the data of the UE in the specific direction to be transmitted over the MeNB in the case that the data is not to be distributed for the bearer in the specific direction; and change information about a proportion of the data of the UE in the specific direction to be transmitted over the SeNB in the case that the data is to be distributed for the bearer in the specific direction.

Optionally, the first determination and processing unit 182 is further configured to: receive a direction change request from the SeNB, the direction change request indicating change information about the data of the UE in the specific direction to be transmitted over the MeNB in the case that the data is not to be distributed for the bearer in the specific direction; and in the case that the direction change request from the SeNB has been accepted, configure the connection for the UE, and otherwise, send a message for rejecting the direction change request to the SeNB.

Optionally, the first determination and processing unit 182 is further configured to: receive a proportion change request from the SeNB, the proportion change request indicating change information about the proportion of the data of the UE in the specific direction to be transmitted over the MeNB and/or the proportion of the data of the UE in the specific direction to be transmitted over the SeNB in the case that the data is to be distributed for the bearer in the specific direction; and in the case that the proportion change request from the SeNB has been accepted, configure the connection for the UE, and otherwise send a message for rejecting the proportion change request to the SeNB.

Figure 19:
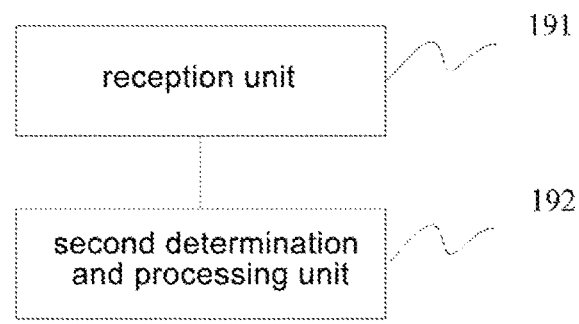
FIG. 19 is another schematic view showing the bearer admission control apparatus according to one embodiment of the present disclosure.

Optionally, in the case that the bearer admission control apparatus is used at an SeNB side, as shown in FIG. 19, it may further include: a reception unit 191 configured to receive, in the case that the MeNB needs to perform the bearer separation with the SeNB with respect to the same UE, the SeNB addition request message from the MeNB so as to acquire the information about the list of the E-RABs corresponding to the UE to be admitted by the SeNB and the indication information indicating whether or not data is to be distributed for the bearer in the specific direction, the specific direction being an uplink direction or a downlink direction; and a second determination and processing unit 192 configured to generate the bearer admission result in accordance with the information about the list of the E-RABs and the indication information, and send a feedback message to the MeNB, the feedback message carrying the bearer admission result.

Correspondingly, the present disclosure further provides in some embodiments a bearer admission control apparatus. In the case that the bearer admission control apparatus is used as an SeNB, as shown in FIG. 19, it may include: a reception unit 191 configured to receive, in the case that an MeNB needs to perform bearer separation with the SeNB with respect to an identical UE, an SeNB addition request message from the MeNB so as to acquire information about a list of E-RABs corresponding to the UE to be admitted by the SeNB and indication information indicating whether or not data is to be distributed for the bearer in a specific direction, the specific direction being an uplink direction or a downlink direction; and a second determination and processing unit 192 configured to generate a bearer admission result in accordance with the information about the list of the E-RABs and the indication information, and send a feedback message to the MeNB, the feedback message carrying the bearer admission result.

According to the bearer admission control apparatus in the embodiments of the present disclosure, in the case that the MeNB needs to perform the bearer separation with the SeNB with respect to the same UE and the SeNB needs to be added, the SeNB may receive the indication information indicating whether or not the data is to be distributed for the bearer in the uplink or downlink direction, and send the message for indicating the bearer admission result, i.e., whether or not an uplink or downlink bearer is to be admitted, to the MeNB, so as to enable the eNB to selectively admit the uplink or downlink bearer of the UE, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

Optionally, the bearer admission result includes: a bearer in the specific direction to be admitted or rejected by the SeNB; indication information indicating the data of the UE in the specific direction to be transmitted over the SeNB or the MeNB for the bearers admitted by the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction.

Optionally, the SeNB addition request message further includes indication information indicating whether the data of the UE in the specific direction is to be transmitted over the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction. The bearer admission result of the SeNB includes a bearer in the specific direction to be admitted or rejected by the SeNB.

Optionally, the bearer admission result of the SeNB further includes: a bearer in the specific direction incapable of being admitted by the SeNB; change information about the data of the UE in the specific direction to be transmitted over the MeNB in the case that data is not to be distributed for the bearer in the specific direction; and change information about a proportion of the data of the UE in the specific direction to be transmitted over the SeNB in the case that the data is to be distributed for the bearer in the specific direction.

Optionally, the second determination and processing unit 192 is further configured to, when the data of the UE in the specific direction is changed to be transmitted over the MeNB, send a direction change request to the MeNB, the direction change request carrying change information about the data of the UE in the specific direction to be transmitted over the MeNB in the case that the data is not to be distributed for the bearer in the specific direction.

Optionally, the second determination and processing unit 192 is further configured to, in the case that the proportion of the data of the UE in the specific direction to be transmitted over the MeNB and the proportion of the data of the UE in the specific direction to be transmitted over the SeNB need to be changed, sending, by the SeNB, a proportion change request to the MeNB, the proportion change request carrying change information about the proportion of the data of the UE in the specific direction to be transmitted over the MeNB and/or the proportion of the data of the UE in the specific direction to be transmitted over the SeNB in the case that the data is to be distributed for the bearer in the specific direction.

Optionally, the SeNB addition unit 181, the first determination and processing unit 182, the reception unit 191 and the second determination and processing unit 192 may each be an entity, such as a processor having a transmission function and a reception function. The above-mentioned bearer admission control apparatuses may each include the processor and a memory having a storage function for storing the relevant information.

Figure 20:
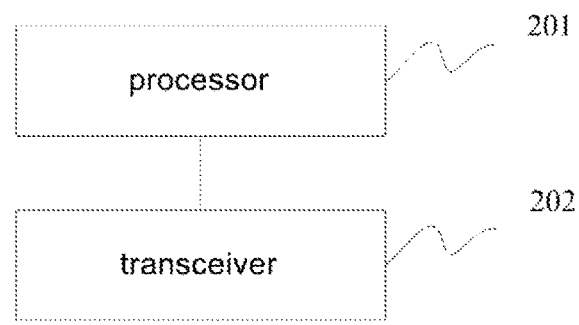
FIG. 20 is a schematic view showing an eNB according to one embodiment of the present disclosure.

The present disclosure further provides in some embodiments an eNB which, as shown in FIG. 20, includes a processor 201 and a transceiver 202. In the case that the eNB is an MeNB and the MeNB needs to perform bearer separation with an SeNB with respect to an identical UE, the processor is configured to: generate an SeNB addition request message and trigger the transceiver to send the SeNB addition request message to the SeNB, the SeNB addition request message carrying information about a list of E-RABs corresponding to the UE admitted by the SeNB as well as indication information indicating whether or not data is to be distributed for the bearer in a specific direction, the specific direction being an uplink direction or a downlink direction; and in the case that the a feedback message has been received by the transceiver from the SeNB, acquire a bearer admission result of the SeNB, configure connection for the UE and trigger the transceiver to send a connection configuration to the UE in the case that the bearer admission result of the SeNB has been accepted, and otherwise trigger the transceiver to send a message for rejecting the bearer admission result of the SeNB to the SeNB.

According to the MeNB in the embodiments of the present disclosure, in the case that the MeNB needs to perform the bearer separation with the SeNB with respect to the same UE and the SeNB needs to be added, it may indicate the SeNB whether or not the data is to be distributed for the bearer in the uplink or downlink direction. Next, the SeNB may send the message for indicating the bearer admission result, i.e., whether or not an uplink or downlink bearer is to be admitted, to the MeNB, so as to enable the eNB to selectively admit the uplink or downlink bearer of the UE, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

Optionally, the bearer admission result of the SeNB includes: a bearer in the specific direction to be admitted or rejected by the SeNB; indication information indicating the data of the UE in the specific direction to be transmitted over the SeNB or the MeNB for the bearers admitted by the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction.

Optionally, the SeNB addition request message further includes indication information indicating whether the data of the UE in the specific direction is to be transmitted over the MeNB or the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction. The bearer admission result of the SeNB includes a bearer in the specific direction to be admitted or rejected by the SeNB.

Optionally, the bearer admission result of the SeNB further includes: a bearer in the specific direction incapable of being admitted by the SeNB; change information about the data of the UE in the specific direction to be transmitted over the MeNB in the case that data is not to be distributed for the bearer in the specific direction; and change information about a proportion of the data of the UE in the specific direction to be transmitted over the SeNB in the case that the data is to be distributed for the bearer in the specific direction.

Optionally, the transceiver is further configured to receive a direction change request from the SeNB, the direction change request indicating change information about the data of the UE in the specific direction to be transmitted over the MeNB in the case that the data is not to be distributed for the bearer in the specific direction. In the case that the direction change request from the SeNB has been accepted, the processor is further configured to configure the connection for the UE and trigger the transceiver to transmit the connection configuration to the UE, and otherwise trigger the transceiver to send a message for rejecting the direction change request to the SeNB.

Optionally, the transceiver is further configured to receive a proportion change request from the SeNB, the proportion change request indicating change information about the proportion of the data of the UE in the specific direction to be transmitted over the MeNB and/or the proportion of the data of the UE in the specific direction to be transmitted over the SeNB in the case that the data is to be distributed for the bearer in the specific direction. In the case that the proportion change request from the SeNB has been accepted, the processor is further configured to configure the connection for the UE and trigger the transceiver to send the connection configuration to the UE, and otherwise trigger the transceiver to send a message for rejecting the proportion change request to the SeNB.

Optionally, the transceiver is further configured to, in the case that the eNB is the SeNB, receive the SeNB addition request message from the MeNB in the case that the MeNB needs to perform the bearer separation with the SeNB with respect to the same UE. The processor is further configured to: acquire from the SeNB addition request message the information about the list of the E-RABs corresponding to the UE to be admitted by the SeNB and the indication information indicating whether or not the data is to be distributed for the bearer in the specific direction, the specific direction being an uplink direction or a downlink direction; and generate the bearer admission result in accordance with the information about the list of the E-RABs and the indication information, and trigger the transceiver to send the feedback message to the MeNB, the feedback message carrying the bearer admission result.

The present disclosure further provides in some embodiments an eNB, which includes a processor and a transceiver. In the case that the eNB is an SeNB, the transceiver is configured to receive an SeNB addition request message from an MeNB in the case that the MeNB needs to perform bearer separation with the SeNB with respect to an identical UE. The processor is configured to: acquire from the SeNB addition request message information about a list of E-RABs corresponding to the UE to be admitted by the SeNB and indication information indicating whether or not the data is to be distributed for the bearer in a specific direction, the specific direction being an uplink direction or a downlink direction; and generate the bearer admission result in accordance with the information about the list of the E-RABs and the indication information, and trigger the transceiver to send a feedback message to the MeNB, the feedback message carrying a bearer admission result.

According to the SeNB in the embodiments of the present disclosure, in the case that the MeNB needs to perform the bearer separation with the SeNB with respect to the same UE and the SeNB needs to be added, the SeNB may receive the indication information indicating whether or not the data is to be distributed for the bearer in the uplink or downlink direction, and send the message for indicating the bearer admission result, i.e., whether or not an uplink or downlink bearer is to be admitted, to the MeNB, so as to enable the eNB to selectively admit the uplink or downlink bearer of the UE, i.e., to enable the eNB to transmit the downlink data in the case of uplink congestion or transmit the uplink data in the case of downlink congestion, thereby to improve the data throughput at the UE side and the network side, and reduce the probability of releasing the bearer in the case of a heavy network load.

Optionally, the bearer admission result includes: a bearer in the specific direction to be admitted or rejected by the SeNB; indication information indicating the data of the UE in the specific direction to be transmitted over the SeNB or the MeNB for the bearers admitted by the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction.

Optionally, the SeNB addition request message further includes indication information indicating whether the data of the UE in the specific direction is to be transmitted over the MeNB or the SeNB in the case that the data is not to be distributed for the bearer in the specific direction; and a proportion of the data of the UE in the specific direction to be transmitted over the MeNB and/or a proportion of the data of the UE in the specific direction to be transmitted over the SeNB in the case that the data is to be distributed for the bearer in the specific direction. The bearer admission result of the SeNB includes a bearer in the specific direction to be admitted or rejected by the SeNB.

Optionally, the bearer admission result of the SeNB further includes: a bearer in the specific direction incapable of being admitted by the SeNB; change information about the data of the UE in the specific direction to be transmitted over the MeNB in the case that data is not to be distributed for the bearer in the specific direction; and change information about a proportion of the data of the UE in the specific direction to be transmitted over the SeNB in the case that the data is to be distributed for the bearer in the specific direction.

Optionally, the processor is further configured to, in the case that the data of the UE in the specific direction is changed to be transmitted over the MeNB, trigger the transceiver to send a direction change request to the MeNB, the direction change request indicating change information about the data of the UE in the specific direction to be transmitted over the MeNB in the case that the data is not to be distributed for the bearer in the specific direction.

Optionally, the processor is further configured to, in the case that the proportion of the data of the UE in the specific direction to be transmitted over the MeNB and the proportion of the data of the UE in the specific direction to be transmitted over the SeNB need to be changed, trigger the transceiver to send a proportion change request to the MeNB, the proportion change request carrying change information about the proportion of the data of the UE in the specific direction to be transmitted over the MeNB and/or the proportion of the data of the UE in the specific direction to be transmitted over the SeNB in the case that the data is to be distributed for the bearer in the specific direction.

In a word, according to the embodiments of the present disclosure, the target/slave eNB that has received the bearer establishment request may select to separately admit or reject the uplink or downlink bearer, so as to separately support the transmission of the uplink or downlink data. The target/slave eNB may send a message to the source/master eNB that has sent the bearer establishment request, so as to notify the source/master eNB of whether or not the uplink or downlink bearer has been admitted or rejected. The slave eNB may also send to the master eNB a request message for changing the direction or proportion of the uplink or downlink data to be transmitted, so as to separately support the transmission of the uplink or downlink data. The master eNB may notify the slave eNB of a result of the request, and separately support the transmission of the uplink or downlink data over the slave eNB and the master eNB. Hence, in the case of a large number of small cells are deployed within the coverage of a macrocell, the bearer separation may be performed for the UE, so as to transmit the data over a plurality of eNBs. In the embodiments of the present disclosure, the eNB may selectively admit the uplink or downlink bearer of the UE, and as a result, it is able to transmit the downlink data in the case of uplink congestion or transmit the uplink data in the case of downlink congestion, thereby to improve the data throughput at the UE side and the network side, and reduce the probability of releasing the bearer in the case of a heavy network load.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A bearer admission control method, comprising:
    when a Master Evolved NodeB (MeNB) needs to perform bearer separation with a Slave Evolved NodeB (SeNB) with respect to an identical User Equipment (UE), sending, by the MeNB, an SeNB addition request message to the SeNB, the SeNB addition request message carrying information about a list of Evolved Universal Terrestrial Radio Access Network (E-UTRAN) Radio Access Bearers (E-RABs) corresponding to the UE to be admitted by the SeNB as well as indication information indicating whether or not data is to be distributed for the bearer in a specific direction only, the specific direction being an uplink direction or a downlink direction; and
    receiving, by the MeNB, a feedback message from the SeNB so as to acquire a bearer admission result of the SeNB, configuring, by the MeNB, connection for the UE in the case that the MeNB has accepted the bearer admission result of the SeNB, and otherwise, sending, by the MeNB, a message for rejecting the bearer admission result of the SeNB to the SeNB;
    wherein the bearer admission result of the SeNB comprises change information about the data of the UE in the specific direction to be transmitted over the MeNB.

2. The bearer admission control method according to claim 1, wherein the bearer admission result of the SeNB comprises:
    a bearer in the specific direction to be admitted or rejected by the SeNB;
    indication information indicating the data of the UE in the specific direction to be transmitted over the SeNB or the MeNB for the bearers admitted by the SeNB in the case that the data is not to be distributed for the bearer in the specific direction; and
    a proportion of the data of the UE in the specific direction to be transmitted over the MeNB and/or a proportion of the data of the UE in the specific direction to be transmitted over the SeNB in the case that the data is to be distributed for the bearer in the specific direction.

3. The bearer admission control method according to claim 1, wherein the SeNB addition request message further comprises indication information indicating whether the data of the UE in the specific direction is to be transmitted over the MeNB or the SeNB in the case that the data is not to be distributed for the bearer in the specific direction, and a proportion of the data of the UE in the specific direction to be transmitted over the MeNB and/or a proportion of the data of the UE in the specific direction to be transmitted over the SeNB in the case that the data is to be distributed for the bearer in the specific direction; and
    the bearer admission result of the SeNB comprises a bearer in the specific direction to be admitted or rejected by the SeNB.

4. The bearer admission control method according to claim 3, wherein the bearer admission result of the SeNB further comprises:
    a bearer in the specific direction incapable of being admitted by the SeNB;
    change information about the data of the UE in the specific direction to be transmitted over the MeNB in the case that the data is not to be distributed for the bearer in the specific direction; and
    change information about a proportion of the data of the UE in the specific direction to be transmitted over the SeNB in the case that the data is to be distributed for the bearer in the specific direction.

5. The bearer admission control method according to claim 2, wherein in the case that the admission of the bearer in the specific direction has been rejected by the SeNB, the SeNB does not feed back to the MeNB a data transmission state of the UE in the specific direction.

6. The bearer admission control method according to claim 1, further comprising:
    receiving, by the MeNB, a direction change request from the SeNB, the direction change request indicating change information about the data of the UE in the specific direction to be transmitted over the MeNB in the case that the data is not to be distributed for the bearer in the specific direction; and
    in the case that the MeNB has accepted the direction change request from the SeNB, configuring, by the MeNB, the connection for the UE, and otherwise, sending, by the MeNB, a message for rejecting the direction change request to the SeNB.

7. The bearer admission control method according to claim 1, further comprising:
    receiving, by the MeNB, a proportion change request from the SeNB, the proportion change request indicating change information about the proportion of the data of the UE in the specific direction to be transmitted over the MeNB and/or the proportion of the data of the UE in the specific direction to be transmitted over the SeNB in the case that the data is to be distributed for the bearer in the specific direction; and
    in the case that the MeNB has accepted the proportion change request from the SeNB, configuring, by the MeNB, the connection for the UE, and otherwise sending, by the MeNB, a message for rejecting the proportion change request to the SeNB.

8. A bearer admission control method, comprising:
receiving, by a Slave Evolved NodeB (SeNB), an SeNB addition request message from a Master Evolved NodeB (MeNB) in the case that the MeNB needs to perform bearer separation with the SeNB with respect to an identical User Equipment (UE), acquiring, from the SeNB addition request message, information about a list of Evolved Universal Terrestrial Radio Access Network (E-UTRAN) Radio Access Bearers (E-RABs) corresponding to the UE to be admitted by the SeNB as well as indication information indicating whether or not data is to be distributed for the bearer in a specific direction only, the specific direction being an uplink direction or a downlink direction; and
generating, by the SeNB, a bearer admission result in accordance with the information about the list of the E-RABs and the indication information, and sending, by the SeNB, a feedback message to the MeNB, the feedback message carrying the bearer admission result of the SeNB,
wherein the bearer admission result of the SeNB comprises change information about the data of the UE in the specific direction to be transmitted over the MeNB.

9. The bearer admission control method according to claim 8, wherein the bearer admission result of the SeNB comprises:
a bearer in the specific direction to be admitted or rejected by the SeNB;
indication information indicating the data of the UE in the specific direction to be transmitted over the SeNB or the MeNB for the bearers admitted by the SeNB in the case that the data is not to be distributed for the bearer in the specific direction; and
a proportion of the data of the UE in the specific direction to be transmitted over the MeNB and/or a proportion of the data of the UE in the specific direction to be transmitted over the SeNB in the case that the data is to be distributed for the bearer in the specific direction.

10. The bearer admission control method according to claim 8, wherein the SeNB addition request message further comprises indication information indicating whether the data of the UE in the specific direction is to be transmitted over the MeNB or the SeNB in the case that the data is not to be distributed for the bearer in the specific direction, and a proportion of the data of the UE in the specific direction to be transmitted over the MeNB and/or a proportion of the data of the UE in the specific direction to be transmitted over the SeNB in the case that the data is to be distributed for the bearer in the specific direction; and
the bearer admission result of the SeNB comprises a bearer in the specific direction to be admitted or rejected by the SeNB.

11. The bearer admission control method according to claim 10, wherein the bearer admission result of the SeNB further comprises:
a bearer in the specific direction incapable of being admitted by the SeNB;
change information about the data of the UE in the specific direction to be transmitted over the MeNB in the case that the data is not to be distributed for the bearer in the specific direction; and
change information about a proportion of the data of the UE in the specific direction to be transmitted over the SeNB in the case that the data is to be distributed for the bearer in the specific direction.

12. The bearer admission control method according to claim 9, wherein in the case that the admission of the bearer in the specific direction has been rejected by the SeNB, the SeNB does not feed back to the MeNB a data transmission state of the UE in the specific direction.

13. The bearer admission control method according to claim 8, further comprising, when the data of the UE in the specific direction is changed to be transmitted over the MeNB, sending, by the SeNB, a direction change request to the MeNB, the direction change request carrying change information about the data of the UE in the specific direction to be transmitted over the MeNB in the case that the data is not to be distributed for the bearer in the specific direction.

14. The bearer admission control method according to claim 8, further comprising, in the case that the proportion of the data of the UE in the specific direction to be transmitted over the MeNB and the proportion of the data of the UE in the specific direction to be transmitted over the SeNB need to be changed, sending, by the SeNB, a proportion change request to the MeNB, the proportion change request carrying change information about the proportion of the data of the UE in the specific direction to be transmitted over the MeNB and/or the proportion of the data of the UE in the specific direction to be transmitted over the SeNB in the case that the data is to be distributed for the bearer in the specific direction.

15. An Evolved NodeB (eNB), comprising a processor and a transceiver, wherein in the case that the eNB is a Slave Evolved NodeB (SeNB), the transceiver is configured to receive an SeNB addition request message from a Master Evolved NodeB (MeNB) in the case that the MeNB needs to perform bearer separation with the SeNB with respect to an identical User Equipment (UE), and
the processor is configured to: acquire, from the SeNB addition request message, information about a list of Evolved Universal Terrestrial Radio Access Network (E-UTRAN) Radio Access Bearers (E-RABs) corresponding to the UE to be admitted by the SeNB and indication information indicating whether or not the data is to be distributed for the bearer in a specific direction only, the specific direction being an uplink direction or a downlink direction; and generate the bearer admission result in accordance with the information about the list of the E-RABs and the indication information, and trigger the transceiver to send a feedback message to the MeNB, the feedback message carrying a bearer admission result,
wherein the bearer admission result of the SeNB comprises change information about the data of the UE in the specific direction to be transmitted over the MeNB.

16. The eNB according to claim 15, wherein the bearer admission result of the SeNB comprises:
a bearer in the specific direction to be admitted or rejected by the SeNB;
indication information indicating the data of the UE in the specific direction to be transmitted over the SeNB or the MeNB for the bearers admitted by the SeNB in the case that the data is not to be distributed for the bearer in the specific direction; and
a proportion of the data of the UE in the specific direction to be transmitted over the MeNB and/or a proportion of the data of the UE in the specific direction to be transmitted over the SeNB in the case that the data is to be distributed for the bearer in the specific direction.

17. The eNB according to claim 15, wherein the SeNB addition request message further comprises indication information indicating whether the data of the UE in the specific direction is to be transmitted over the MeNB or the SeNB in the case that the data is not to be distributed for the bearer in the specific direction, and a proportion of the data of the UE in the specific direction to be transmitted over the MeNB and/or a proportion of the data of the UE in the specific direction to be transmitted over the SeNB in the case that the data is to be distributed for the bearer in the specific direction; and the bearer admission result of the SeNB comprises a bearer in the specific direction to be admitted or rejected by the SeNB.

18. The eNB according to claim 17, wherein the bearer admission result of the SeNB further comprises:
a bearer in the specific direction incapable of being admitted by the SeNB;
change information about the data of the UE in the specific direction to be transmitted over the MeNB in the case that the data is not to be distributed for the bearer in the specific direction; and
change information about a proportion of the data of the UE in the specific direction to be transmitted over the SeNB in the case that the data is to be distributed for the bearer in the specific direction.

19. The bearer admission control method according to claim 4, wherein in the case that the admission of the bearer in the specific direction has been rejected by the SeNB, the SeNB does not feed back to the MeNB a data transmission state of the UE in the specific direction.

20. The bearer admission control method according to claim 11, wherein in the case that the admission of the bearer in the specific direction has been rejected by the SeNB, the SeNB does not feed back to the MeNB a data transmission state of the UE in the specific direction.

* * * * *